(12) United States Patent
Hashimoto et al.

(10) Patent No.: US 10,879,819 B2
(45) Date of Patent: Dec. 29, 2020

(54) DRIVING CIRCUIT AND DRIVING METHOD FOR DC MOTOR

(71) Applicant: ROHM CO., LTD., Kyoto-shi, Kyoto (JP)

(72) Inventors: Hiroki Hashimoto, Kyoto (JP); Masanori Tsuchihashi, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 16/176,412

(22) Filed: Oct. 31, 2018

(65) Prior Publication Data
US 2019/0149070 A1    May 16, 2019

(30) Foreign Application Priority Data

Nov. 2, 2017  (JP) ................... 2017-213089
Nov. 2, 2017  (JP) ................... 2017-213091
Oct. 24, 2018  (JP) ................... 2018-200011

(51) Int. Cl.
*H02P 23/12* (2006.01)
*H02P 6/15* (2016.01)
*H02P 6/08* (2016.01)
*H02P 29/10* (2016.01)
*H02P 6/06* (2006.01)
*G05B 1/00* (2006.01)

(52) U.S. Cl.
CPC ............. *H02P 6/153* (2016.02); *G05B 1/00* (2013.01); *H02P 6/06* (2013.01); *H02P 6/08* (2013.01); *H02P 29/10* (2016.02)

(58) Field of Classification Search
CPC .............................. H02P 6/153; H02P 29/10
USPC ............................................. 318/400.14
See application file for complete search history.

(56) References Cited

U.S. PATENT DOCUMENTS

| 5,612,602 A | * | 3/1997 | Kubota | ............... | G05B 19/237 |
| | | | | | 318/560 |
| 5,744,926 A | * | 4/1998 | Lai | ................. | G05B 11/26 |
| | | | | | 318/590 |
| 2005/0093490 A1 | * | 5/2005 | Shoji | ................. | G05B 19/404 |
| | | | | | 318/60 |
| 2018/0115262 A1 | * | 4/2018 | Kamio | ................. | H02P 6/16 |

FOREIGN PATENT DOCUMENTS

JP    2011114951 A    6/2011
JP       5487910 B    3/2014

* cited by examiner

*Primary Examiner* — Erick D Glass
(74) *Attorney, Agent, or Firm* — Cantor Colburn LLP

(57) ABSTRACT

An error detector generates a position error value ERR that corresponds to a difference between a position instruction value P_REF indicative of a target position of a rotor based on a clock signal CLK and a position detection value P_FB indicative of the current position of the rotor based on pulse signals EN_A and EN_B received from an encoder. A feedback controller generates a torque instruction value T_REF such that a position error value ERR approaches zero. The driving IC is capable of switching modes between a rotational driving control mode and a holding mode. Control characteristics set for the feedback controller are switched according to switching between the rotational driving control mode and the holding mode.

23 Claims, 19 Drawing Sheets

DRIVING CIRCUIT AND DRIVING METHOD FOR DC MOTOR

CROSS REFERENCE TO RELATED APPLICATION

The present application claims priority under 35 U.S.C. § 119 to Japanese Application No. 2017-213089, filed Nov. 2, 2017, Japanese Application No. 2017-213091, filed on Nov. 2, 2017 and Japanese Application No. 2018-200011, filed on Oct. 24, 2018, the entire contents of all three of which are incorporated herein by reference.

BACKGROUND OF THE INVENTION

1. Field of the Invention

The present invention relates to a driving circuit for a DC motor.

2. Description of the Related Art

In order to control positioning of a control target, a stepping motor is employed. A clock signal (pulse rate signal) is used to control such a stepping motor. This arrangement allows such a motor to be rotated using an open-loop method in proportion to the number of pulses of the input clock signal. Furthermore, this arrangement allows the motor to be stopped in a state in which the clock signal is suspended. Due to such ease of control, in many cases, stepping motors are widely employed in office automation equipment such as printers, fax machines, scanners, multi-function printers, etc., or in industrial equipment.

However, with such stepping motors, electric current flows through a coil even in a stopped state, leading to a problem of large power consumption. In recent years, there has been a demand for providing various kinds of applications such as office automation equipment with reduced power consumption. However, power consumption involved in such a stepping motor becomes a bottleneck in providing such office automation equipment with reduced power consumption.

In contrast, a brushless DC motor requires a complicated control operation. However, such a brushless DC motor has an advantage of small power consumption. Accordingly, in the future, applications that require low power consumption will require stepping motors to be replaced by DC motors.

FIG. 1 is a block diagram showing a motor driving system including a DC motor. In this motor driving system, the DC motor is controlled by a control interface using a clock signal in the same manner as with conventional stepping motors. A motor driving system 100R includes a DC motor 102, a host controller 104, a driver 106, and a motor driving apparatus 800. The host controller 104 is configured as a microcomputer or a CPU (Central Processing Unit), and generates a clock signal CK for indicating the position of a rotor of the DC motor 102. The motor control apparatus 800 is also configured as a CPU or a microcomputer, and converts the clock signal into a PWM signal suitable for controlling the driving operation for the DC motor. The driver 106 includes a three-phase inverter, and drives the DC motor 102 according to the PWM signal. Such a system is described in Patent document 1 (Japanese Patent Application No. 5487910), for example.

Problem 1

CPUs and microcomputers are each high-cost components. Accordingly, in a case in which the motor control apparatus 800 for controlling a DC motor is configured as a CPU or a microcomputer, this leads to a problem of an increase in equipment cost.

Furthermore, such a motor driving system 100R requires a designer to design a software program to be executed by the motor control apparatus 800 giving consideration to the specification of the clock signal CK, characteristics of the DC motor 102 to be driven, etc. This involves a problem of increased development costs and a problem of requiring a long development period.

Problem 2

In many applications, a period in which the stepping motor is rotationally driven and a period in which the stepping motor is suspended (holding operation) are alternately generated. In a situation in which no external force is applied, by suspending the supply of electric power to the DC motor, this arrangement is capable of setting the DC motor to a stopped state. However, in a situation in which an external force is applied, the DC motor is required to generate a torque that is in balance with the external force.

SUMMARY OF THE INVENTION

It is an exemplary purpose of an embodiment of the present invention to provide a driving circuit that is capable of solving the problem 1 and/or the problem 2.

1. An embodiment of the present invention relates to a driving circuit for a DC motor. The driving circuit comprises: an error detector structured as a logic circuit, and structured to receive a clock signal from a host controller and a pulse signal from an encoder, and to generate a position error value that is a difference between the current position of a rotor based on the pulse signal and a target position of the rotor based on the clock signal; a feedback controller structured as a logic circuit, and structured to generate an instruction value such that the position error value approaches zero; and a driving signal generating unit structured as a logic circuit, and structured to generate a driving signal that corresponds to the instruction value. The circuit is integrated on a single semiconductor substrate.

2. An embodiment of the present invention relates to a driving circuit for a DC motor. The driving circuit is structured to drive a DC motor according to a clock signal received from a host controller and a pulse signal received from an encoder. The driving circuit comprises: an error detector structured to generate a position error value that corresponds to a difference between a position instruction value indicative of a target position of the rotor based on the clock signal and a position detection value indicative of the current position of the rotor based on the pulse signal; a feedback controller structured to generate a torque instruction value such that the position error value approaches zero; and a driving signal generating unit structured to generate a driving signal that corresponds to the torque instruction value. The mode is switchable between a rotational driving control mode and a holding mode. The control characteristics set for the feedback controller is switched according to switching between the rotational driving control mode and the holding mode.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
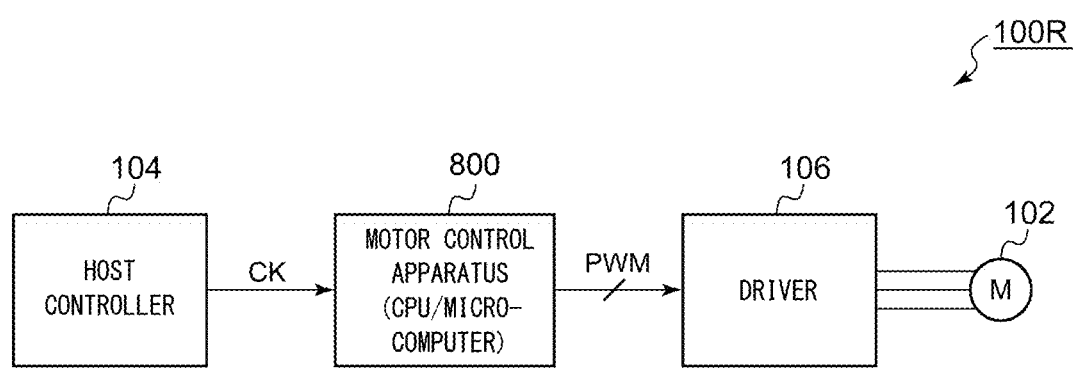
FIG. 1 is a block diagram showing a motor driving system including a DC motor.

The invention will now be described based on preferred embodiments which do not intend to limit the scope of the present invention but exemplify the invention. All of the features and the combinations thereof described in the embodiment are not necessarily essential to the invention.

Overview of Embodiment 1

An embodiment disclosed in the present specification relates to a motor driving circuit (driving IC). The driving IC comprises: an error detector structured as a logic circuit, and structured to receive a clock signal from a host controller and a pulse signal from an encoder, and to generate a position error value that is a difference between the current position of a rotor based on the pulse signal and a target position of the rotor based on the clock signal; a feedback controller structured as a logic circuit, and structured to generate an instruction value such that the position error value approaches zero; and a driving signal generating unit structured as a logic circuit, and structured to generate a driving signal that corresponds to the instruction value. The driving circuit is integrated on a single semiconductor substrate.

By employing this driving IC, this arrangement does not require a microcomputer, CPU, or the like, and accordingly, this arrangement allows a stepping motor to be replaced by a DC motor with a low cost, thereby allowing power consumption required for the system to be reduced.

Also, the feedback controller may comprise a PI (Proportional Integral) controller. The control characteristics (parameter) of the PI controller may be dynamically changed according to the frequency of the clock signal. This provides improved responsiveness.

Also, an integral gain set for the PI controller may be maintained at a constant value. Also, a proportional gain thereof may be changed according to the frequency of the clock signal. By maintaining the integral gain at a constant level, this arrangement is capable of suppressing oscillation of the rotational speed.

Also, the error detector may comprise: a position instruction value generating unit structured to generate a target value that corresponds to an integrated value of the number of edges of the clock signal; a position detection value generating unit structured to generate a feedback value indicative of the current position of the rotor based on the pulse signal; and a subtractor structured to generate a difference between the target value and the feedback value.

Also, the position instruction value generating unit may be structured to select a change amount of the target value for each edge of the clock signal from among multiple values. This arrangement provides an electronic gear.

Also, the position instruction value generating unit may be structured to select a change amount of the feedback value for each pulse of the pulse signal from among multiple values. This arrangement provides an electronic gear.

Also, the driving IC may further comprise a setting pin for specifying a change amount to be set for a target value or otherwise a feedback value.

Also, the driving circuit may further comprise a pre-driver structured to control an inverter that drives the DC motor.

Overview of Embodiment 2

An embodiment disclosed in the present specification relates to a motor driving circuit. The motor driving circuit is structured to drive a DC motor according to a clock signal received from a host controller and a pulse signal received from an encoder. The driving circuit comprises: an error detector structured to generate a position error value that corresponds to a difference between a position instruction value indicative of a target position of the rotor based on the clock signal and a position detection value indicative of the current position of the rotor based on the pulse signal; a feedback controller structured to generate a torque instruction value such that the position error value approaches zero; and a driving signal generating unit structured to generate a driving signal that corresponds to the torque instruction value. The driving circuit is capable of switching the mode between a rotational driving control mode and a holding mode. The control characteristics (control parameters) of the feedback controller is switched according to switching between the rotational driving control mode and the holding mode.

In the rotational driving control mode, this arrangement provides a control parameter prioritizing responsiveness for a rotation instruction according to a clock signal. In the holding mode, this arrangement provides a control parameter prioritizing stability instead of responsiveness. This arrangement allows a DC motor to be driven in the same manner as a stepping motor.

Also, the feedback controller may comprise a PI (Proportional Integral) controller. Also, at least one from among a proportional gain and an integral gain may be switched to a different value according to switching between the rotational driving control mode and the holding mode.

In a case in which the mode is switched while the integrated value remained, such an arrangement continues to generate a torque until the integrated value becomes zero. Such an arrangement has the potential to cause unnecessary oscillation and to require a long delay to stabilize the control operation. In order to solve such a problem, by resetting the integrated value to zero when the mode is switched between the rotational driving control mode and the holding mode, this arrangement is capable of suppressing the occurrence of unnecessary oscillation or otherwise of reducing the time required to stabilize the system.

Also, the driving circuit may further comprise a mode judgment unit structured to judge whether a mode is set to the rotational driving control mode or the holding mode based on an input state of the clock signal. The non-input state of the clock signal signifies an instruction to stop the motor. Accordingly, this arrangement allows the mode to be switched between the rotational driving control mode and the holding mode without a need to provide an additional control line.

Also, the mode judgment unit may comprise a counter structured to measure a duration of a non-input state of the clock signal. Also, when the non-input state of the clock signal has continued for a predetermined period of time, the mode judgment unit may switch the mode from the rotational driving control mode to the holding mode.

Also, the feedback controller may comprise a first controller that relates to the rotational driving control mode and a second controller that relates to the holding mode. By providing the controllers in the form of two systems, this arrangement allows the mode to be switched in a seamless manner.

Also, the feedback controller may comprise a single controller. Also, the gain may be switched according to switching between the rotational driving control mode and the holding mode.

Also, the driving signal generating unit may comprise: a pulse width modulator structured to generate a PWM (Pulse Width Modulation) signal having a duty ratio that corresponds to the torque instruction value; and an energization logic structured to generate the driving signal based on the PWM signal and an output of a Hall comparator.

Also, the driving circuit may further comprise a pre-driver structured to control an inverter structured to drive the DC motor.

Also, the driving circuit may be integrated on a single semiconductor substrate. Examples of such an "integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By integrating the circuit on a single chip, such an arrangement allows the circuit area to be reduced, and allows the circuit elements to have uniform characteristics.

Embodiments

Description will be made below regarding preferred embodiments according to the present invention with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions of the connection between them, in addition to a state in which they are directly coupled.

Figure 2:
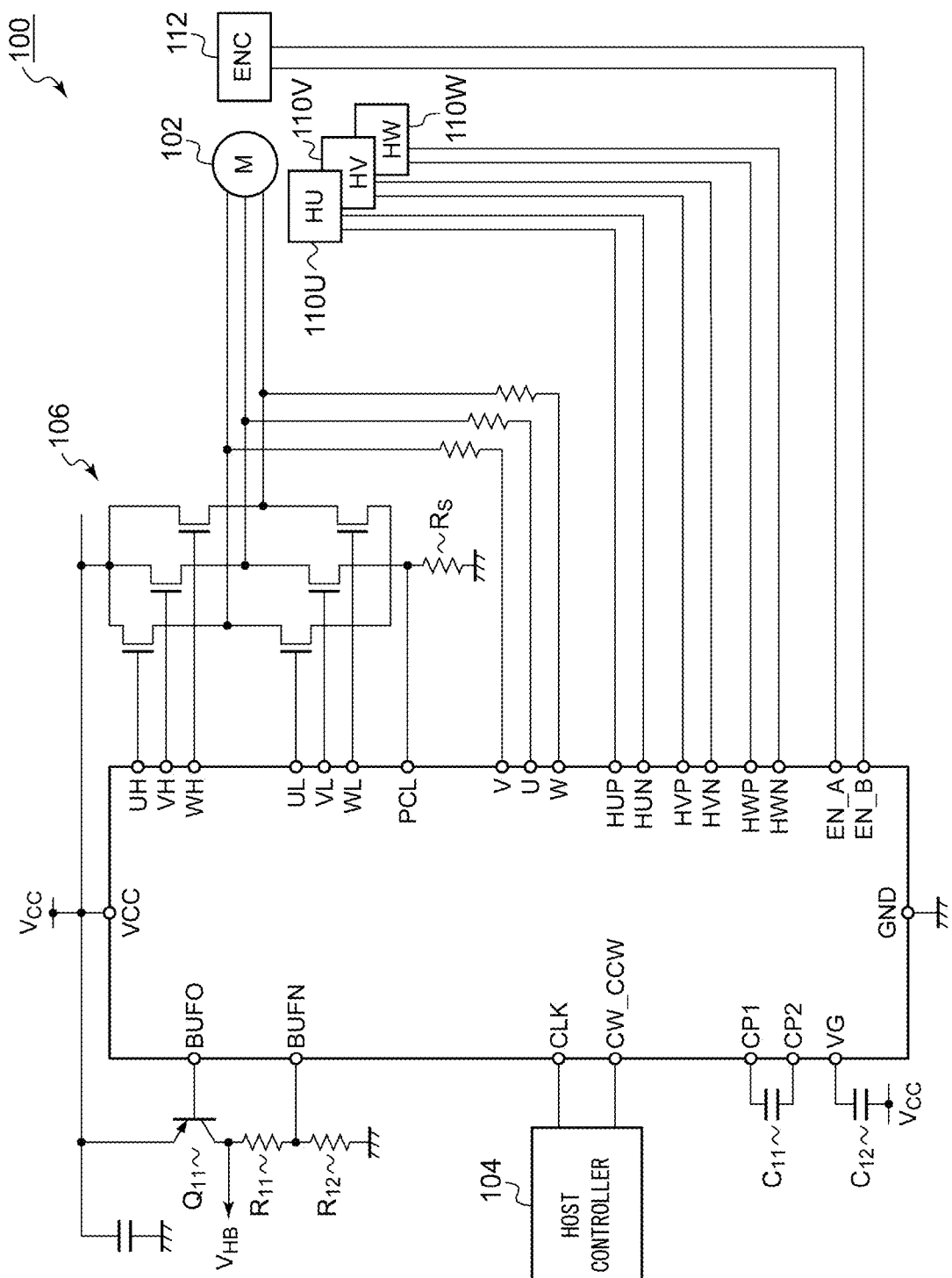
FIG. 2 is a block diagram showing a motor driving system including a driving IC according to one embodiment.

FIG. 2 is a block diagram showing a motor driving system 100 including a driving IC 200 according to one embodiment. The motor driving system 100 further includes a DC motor 102, a host controller 104, a driver 106, Hall sensors 110U through 110W, and an encoder 112, in addition to the driving IC 200. Each signal name, a corresponding pin (terminal) to which the signal is to be input or output, and a corresponding line are denoted by the same reference symbol. Description will be made in the present embodiment regarding an example in which the driving target is configured as a three-phase DC motor.

The host controller 104 is configured as a CPU, ASIC (Application Specified IC), FPGA (Field Programmable Gate Array), or the like. The host controller 104 generates a clock signal CLK indicative of a target position of the rotor of the DC motor 102 (which will also be referred to simply as the "position of the motor" hereafter). Furthermore, the host controller 104 generates a direction instruction signal (CW_CCW signal) indicative of the rotational direction of the motor. These signals are input to the corresponding pins CLK and CW_CC of the driving IC 200, respectively. For example, the low level of the CW_CCW signal is an instruction to rotate the motor in the first direction (e.g., in a clockwise direction). In contrast, the high level of the CW_CCW signal is an instruction to rotate the motor in the second direction (e.g., in a counterclockwise direction).

The driver 106 includes a three-phase inverter and a shunt resistor $R_S$. The output voltages VU through VW of respective phases of the three-phase inverter are input to feedback pins (U through W) of the driving IC 200. The shunt resistor $R_S$ is provided on a path of a current that flows through the three-phase inverter. A voltage drop (detection voltage) occurs across the shunt resistor $R_S$ in proportion to the current. The voltage drop (current detection signal) $V_{CL}$ that occurs across the shunt resistor $R_S$ is input to an RCL (overcurrent detection voltage input) pin of the driving IC 200. The current detection signal $V_{CL}$ can be used to limit the current (current limit) using a pulse-by-pulse method.

The Hall sensors 110U through 110W generate three-phase Hall signals HUP, HUN, HVP, HVN, HWP, and HWN according to the position of the rotor. These signals are input to the corresponding pins of the driving IC 200.

A Hall bias signal $V_{HB}$ is generated by means of the driving IC 200, external transistor $Q_1$, and external resistors $R_{11}$ and $R_{12}$, and is supplied to the Hall sensors 110U through 110W.

The encoder 112 generates pulse signals (A-phase pulse signal EN_A and B-phase pulse signal EN_B) that indicate the information (absolute position, relative position, or displacement) with respect to the rotor position. These pulse signals are input to the corresponding pins of the driving IC 200.

The driving IC 200 generates gate signals for controlling the driver 106 based on the CLK signal, the CW_CCW signal, the Hall signals HUP through HWN, and the pulse signals EN_A and EN_B. The gate signals thus generated are output via UH, VU, WH, UL, VL, and WL pins.

The high-side transistors of the driver 106 are each configured as an N-channel transistor, which requires a voltage that is higher than the power supply voltage $V_{CC}$ in order to provide a gate-driving operation. The driving IC 200 includes a charge pump as a built-in component. An external capacitor is coupled across CP1 and CP2. Another external capacitor is coupled to the VG pin.

The driving IC 200 is configured as a hardware component, i.e., a combination of logic circuits or analog circuits. The "logic circuit configuration" in the present specification means an architecture that does not require a software control operation such as that required by a CPU, microcomputer, or the like.

Furthermore, the power supply voltage is supplied to a power supply (VCC) pin of the driving IC 200. The ground (GND) pin thereof is grounded.

Figure 3:
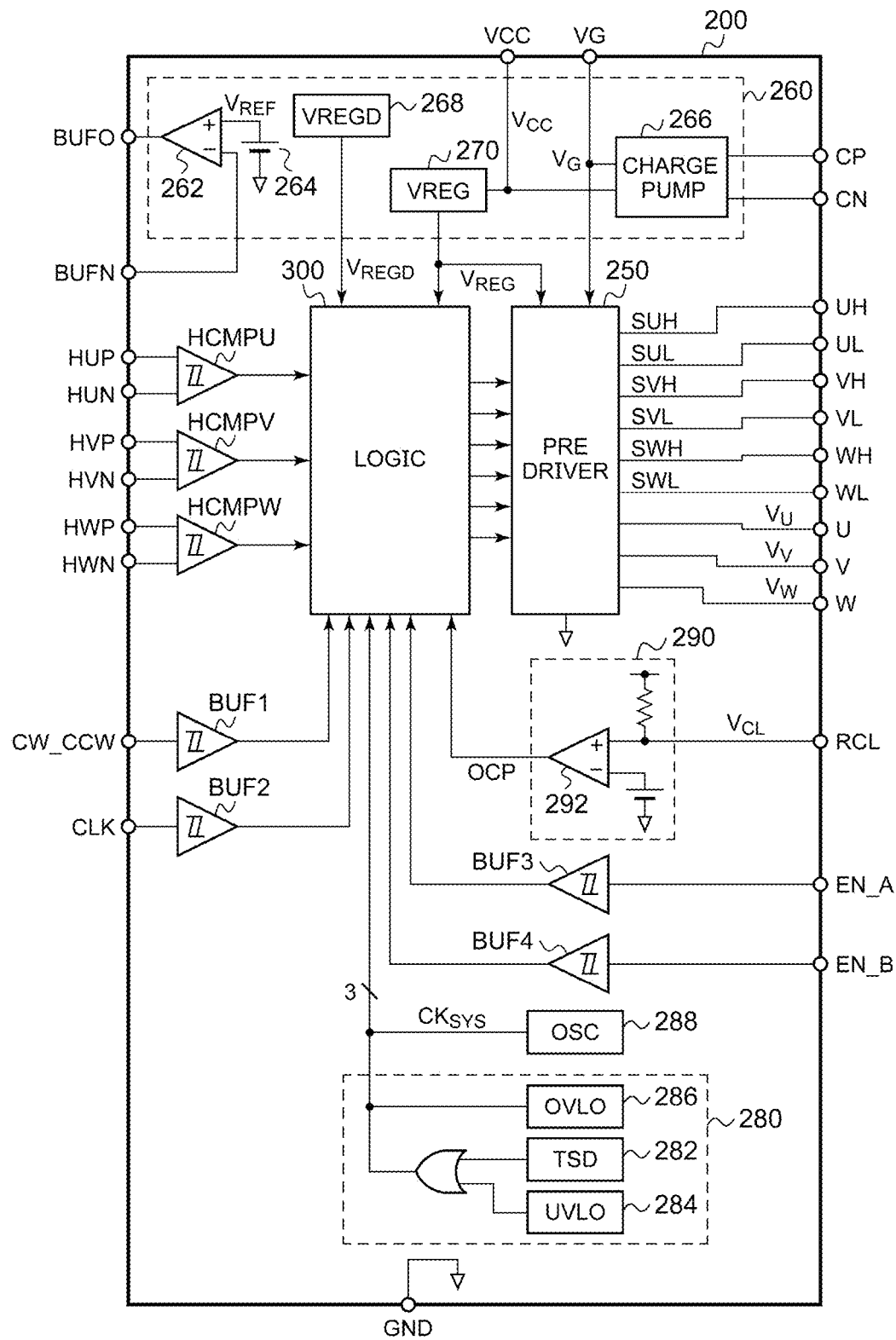
FIG. 3 is a block diagram showing a configuration of the driving IC.

FIG. 3 is a block diagram showing a driving IC 200. The driving IC 200 includes multiple input buffers BUF1 through BUF4, Hall comparators HCMPU through HCMPW, a logic circuit 300, a pre-driver 250, a power supply circuit group 260, and a protection circuit 280.

The multiple input buffers BUF each convert the signal input to the corresponding pin into a binary signal that can be set to the high level or the low level. The U-phase Hall comparator HCMPU compares the same-phase Hall signals, i.e., the U-phase Hall signals HUP and HUN input to the HUP pin and the HUN pin. The V-phase Hall comparator HCMPV and the W-phase Hall comparator HCMPW each perform similar operations. The outputs of the input buffers BUF and the Hall comparators HCMP are input to the logic circuit 300.

The power supply circuit group 260 includes an operational amplifier 262 and a reference voltage source 264, which forms a Hall bias circuit together with external components (transistor $Q_{11}$ and resistors $R_{11}$ and $R_{12}$ shown in FIG. 2). The Hall bias voltage $V_{HB}$ is stabilized to the voltage level represented by the following Expression.

$$V_{HB}=V_{REF}\times(1+R_{11}/R_{12})$$

A charge pump 266 is coupled to the external capacitors (C11 and C12 shown in FIG. 2) via the CP pin, CN pin, and VG pin. The power supply voltage $V_{CC}$ is supplied as the input voltage to the charge pump 266. The charge pump 266 boosts the power supply voltage $V_{CC}$, and applies the high voltage $V_G$ thus boosted to the VG pin. The high voltage $V_G$ is supplied to the pre-driver 250, which is used to drive the high-side transistors (upper-side arm of the driver 106 shown in FIG. 2) configured as a downstream stage.

The power supply circuit 268 generates a power supply voltage $V_{REGD}$ (e.g., 1.5 V) for digital circuits, and supplies the power supply voltage $V_{REGD}$ thus generated to the logic circuit 300. The power supply circuit 270 generates a power supply voltage $V_{REG}$ (e.g., 5 V) for analog circuits, and supplies the power supply voltage $V_{REG}$ to the logic circuit 300 and the pre-driver 250.

The protection circuit 280 includes various kinds of protection circuits. A TSD (Thermal Shut Down) circuit 282 detects an overheat state. An UVLO (Under Voltage Lock Out) circuit 284 detects a low voltage state of the power supply voltage $V_{CC}$. An OVLO (Over Voltage Lock Out) circuit 286 detects an overvoltage state of the power supply voltage $V_{CC}$. The output (detection signal) of each circuit is directly input to the logic circuit 300, or otherwise is indirectly input to the logic circuit 300 via an OR gate.

An oscillator 288 generates a system clock $CK_{SYS}$, and supplies the system clock $CK_{SYS}$ thus generated to the logic circuit 300.

An overcurrent detection circuit 290 is provided in order to provide overcurrent protection based on the detection voltage $V_{CL}$ input to an RCL pin. An OCP (Over Current Protection) comparator 292 compares the detection voltage $V_{CL}$ with a threshold value $V_{TH}$. When $V_{CL}>V_{TH}$ holds true, the OCP comparator 292 asserts (sets to the high level, for example) an OCP signal. The OCP signal is supplied to the logic circuit 300.

The logic circuit 300 generates a driving signal for a driver (three-phase driver) 106 coupled as a downstream stage of the driving IC 200 based on the output of the Hall comparator HCMP or the input buffer BUF. Furthermore, the logic circuit 300 executes various kinds of protection operations for various kinds of abnormal states. For example, when the OCP signal is asserted, the logic circuit 300 executes an overcurrent protection operation using a pulse-by-pulse method. When the protection circuit 280 detects an abnormal state, the logic circuit 300 suspends the driving operation of the motor.

The pre-driver 250 drives the driver 106 configured as a downstream stage according to the driving signal received from the logic circuit 300 and the coil-end voltages $V_U$, $V_V$, and $V_W$ of respective phases fed back to the U, V, and W pins. The coil-end voltages $V_U$, $V_V$, and $V_W$ are used to generate the low levels of the gate signals for the high-side transistors of the driver 106.

The above is the block configuration of the driving IC 200. Next, description will be made regarding the configuration of the logic circuit 300.

Figure 4:
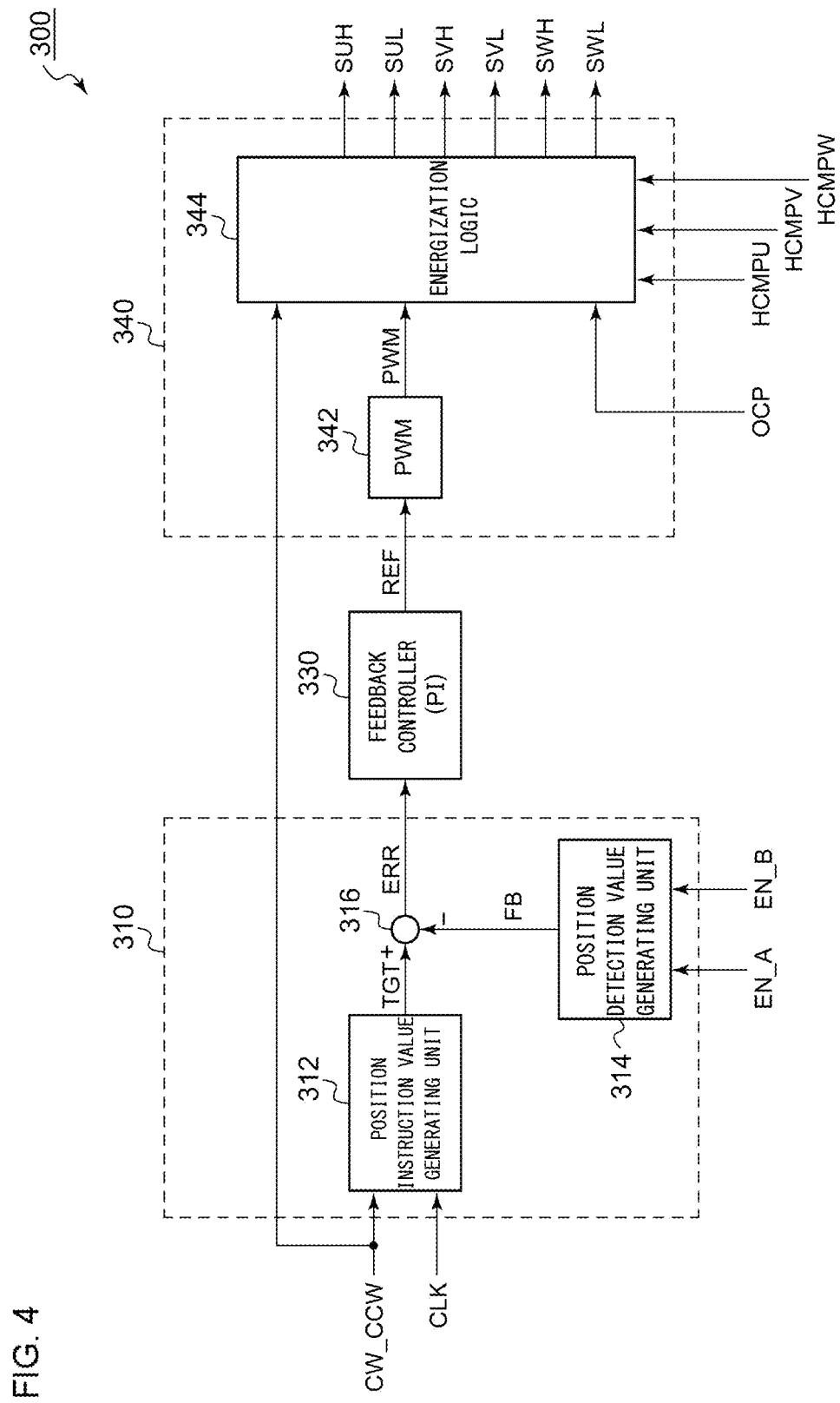
FIG. 4 is a block diagram showing a basic configuration of a logic circuit.

FIG. 4 is a block diagram showing a basic configuration of the logic circuit 300. The logic circuit 300 mainly includes an error detector 310, a feedback controller 330, and a driving signal generating unit 340.

The error detector 310 generates a position error value ERR indicative of the difference between the rotor target position and the current position thereof based on the pulse signals EN_A and EN_B received from the encoder and the integrated value of the number of pulses of the clock signal CK received from the host controller.

The error detector 310 includes a position instruction value generating unit 312, a position detection value generating unit 314, and a subtractor 316. The position instruction value generating unit 312 generates a target value TGT indicative of the rotor target position based on the clock signal CLK and the CW_CCW signal. More specifically, the position instruction value generating unit 312 generates the integrated value of the number of positive edges (and/or negative edges, which will be simply referred to as "edges") of the clock signal CLK.

The position detection value generating unit 314 generates a feedback value FB indicative of the current position of the rotor based on the pulse signals EN_A and EN_B received from the encoder 112. The subtractor 316 generates a difference between the target value TGT and the feedback value FB.

The feedback controller 330 generates a control instruction value REF such that the position error value ERR approaches zero. For example, the feedback controller 330 may include a PI (Proportional Integral) controller. The control instruction value REF may be configured as a motor torque instruction value.

The driving signal generating unit 340 generates driving signals SUH, SUL, SVH, SVL, SWH, and SWL, according to the instruction value REF. For example, the driving signal generating unit 340 includes a pulse width modulator 342 and an energization logic 344. The pulse width modulator 342 generates a PWM (Pulse Width Modulation) signal having a duty ratio that corresponds to the control instruction value REF.

The energization logic 344 determines the rotational direction based on the CW_CCW signal. Furthermore, the energization logic 344 switches the phase (driving phase) of the driving target based on the Hall comparators HCMPU through HCMPW (commutation control operation). The energization method is not restricted in particular. For example, a 120-degree energization control operation (rectangular wave driving operation) may be employed. Otherwise, another energization method such as a 180-degree energization method (sine wave driving operation) may be employed.

The energization logic 344 modulates one from among the driving signals SUH, SUL, SVH, SVL, SWH, and SWL according to the PWM signal. The PWM control method is not restricted in particular. For example, only the logical signals configured as the high-side driving signals SUH, SVH, and SWH may be modulated while the logical signals configured as the low-side driving signals SUL, SVL, and SWL are fixed. Conversely, only the logical signals configured as the low-side driving signals SUL, SVL, and SWL may be modulated. Also, both the high-side driving signals SUH, SVH, and SWH and the low-side driving signals SUL, SVL, and SWL may be modulated.

The energization logic 344 may execute a current limiting operation using a pulse-by-pulse method according to the OCP signal. Specifically, when the OCP signal is asserted, the energization logic 344 changes the driving signals SUH through SWH and SUL through SWL so as to turn off the energized transistors.

The pulse width modulator 342 and the energization logic 344 may have the same configurations as those of conventional DC motor driving circuits, which may be configured using known techniques.

Figure 5:
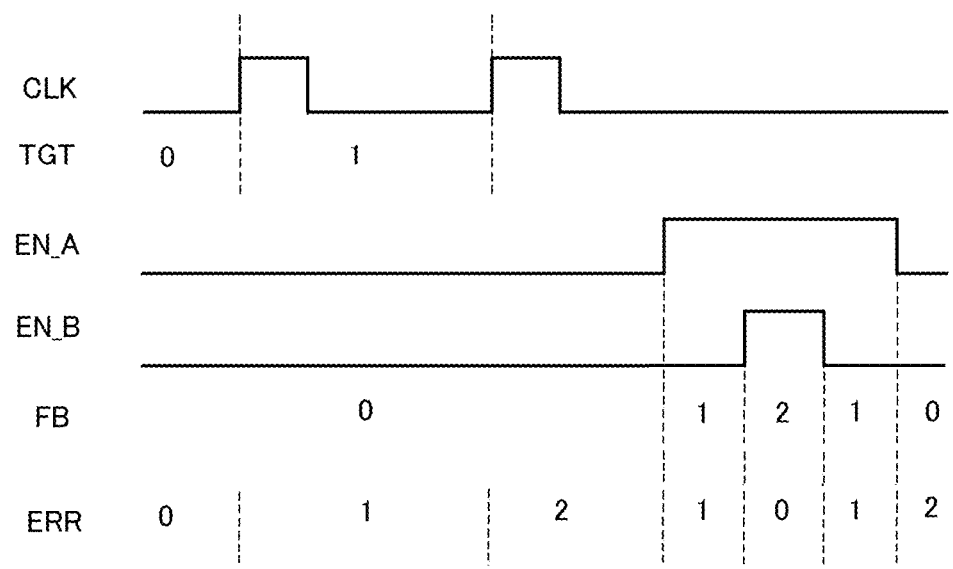
FIG. 5 is a diagram for explaining an error detector.

FIG. 5 is a diagram for explaining the operation of the error detector 310. Description will be made regarding an example in which the CS_CCW signal is set to the low level. The target value TGT is incremented by 1 every time an edge occurs in the clock signal CLK, which increments the position error value ERR by 1. Furthermore, the feedback value FB is changed according to a combination of the pulse signals EN_A and EN_B. As a result, this reduces or otherwise increases the position error value ERR.

Figure 6A:
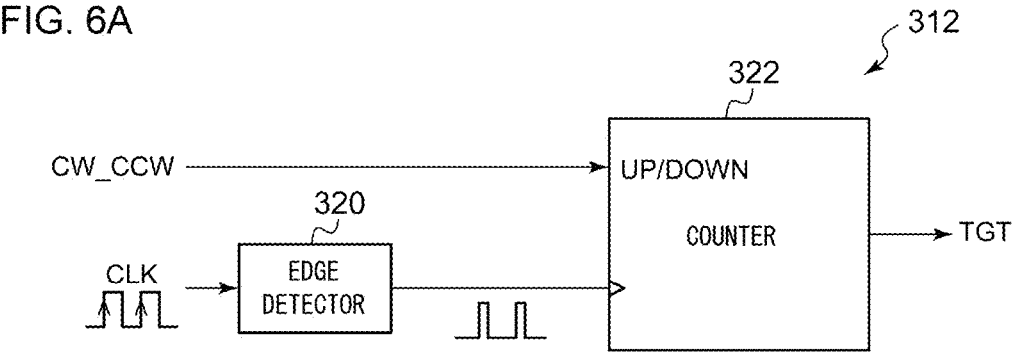
FIGS. 6A through 6C are block diagrams each showing an example configuration of a position instruction value generating unit.
Figure 6B:
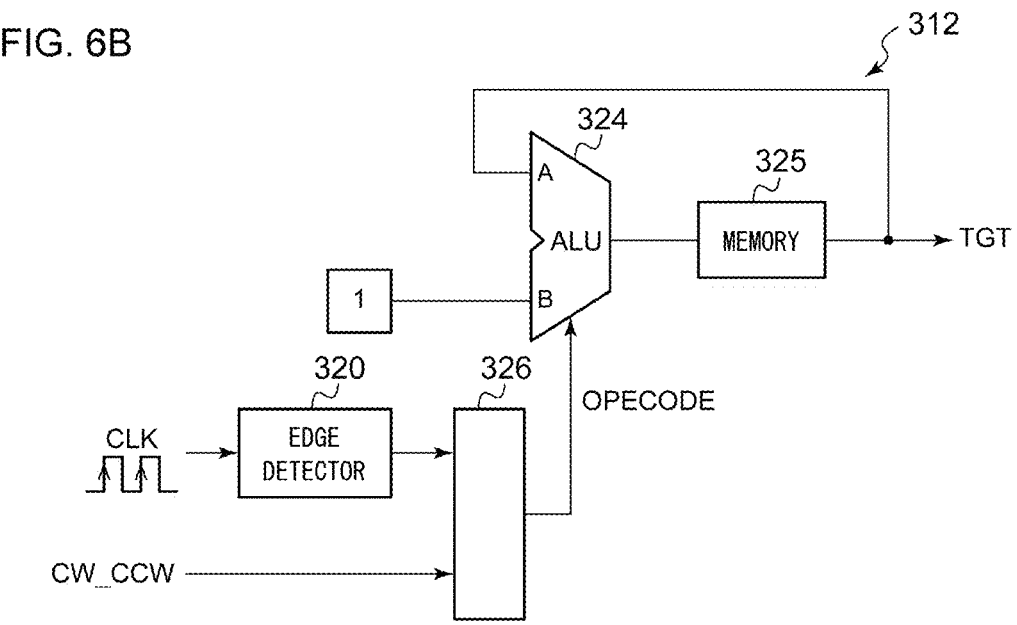
Figure 6C:
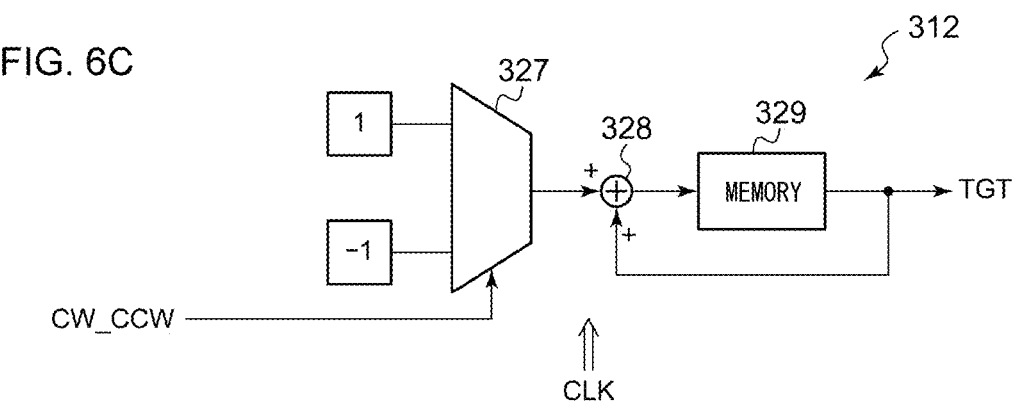

FIGS. 6A through 6C are diagrams each showing an example configuration of the position instruction value generating unit 312. The position instruction value generating unit 312 shown in FIG. 6A includes an edge detection circuit 320 that detects an edge of the clock signal CLK, and a counter 322 that counts up or down for every edge. The CW_CCW signal for indicating the rotational direction is used to select the counter mode from among the count-up mode and the count-down mode. The output of the counter 322 is used as the target value TGT.

The position instruction value generating unit 312 shown in FIG. 6B includes a calculation unit 324, memory (a register) 325 and an operation code selector 326. The calculation unit 324 may be switched between at least an adder mode A+B and a subtractor mode A−B according to an operation code (OPECODE). The value stored in the memory 325 (position error value ERR) is input to the input A, and the fixed value "1" is input to the input B. The operation code selector 326 issues an operation code every time an edge is detected in the clock signal CLK. When the CW_CCW signal is set to the first level, the operation code is set to the adder mode. When the CW_CCW signal is set to the second level, the operation code is set to the subtractor mode. In this arrangement, the memory 325 stores the integrated value of the number of edges of the clock signal CLK, which is used as the target value TGT.

The position instruction value generating unit 312 shown in FIG. 6C includes a selector 327, an adder 328, and memory 329. The selector 327 receives, as its input, values "1" and "−1", and selects one from among the values thus received according to the value of the CW_CCW signal. The adder 328 operates according to an edge of the clock signal CLK so as to generate the sum of the output of the selector 327 and the value stored in the memory 329. The value stored in the memory 329 is updated based on the addition result. With this arrangement, the memory 329 stores the integrated value of the number of edges of the clock signal CLK, which is used as the target value TGT.

The above is the configuration of the logic circuit 300.

By employing the driving IC 200 according to the embodiment, such an arrangement does not require a microcomputer or a CPU (900 shown in FIG. 1) employed in conventional systems. This allows stepping motors to be replaced by DC motors with low costs. Furthermore, this arrangement provides an advantage of reduced power consumption of the system.

Next, description will be further made regarding the features of the driving IC 200.

Rotational Driving Control Mode and Holding Mode

Figure 7:
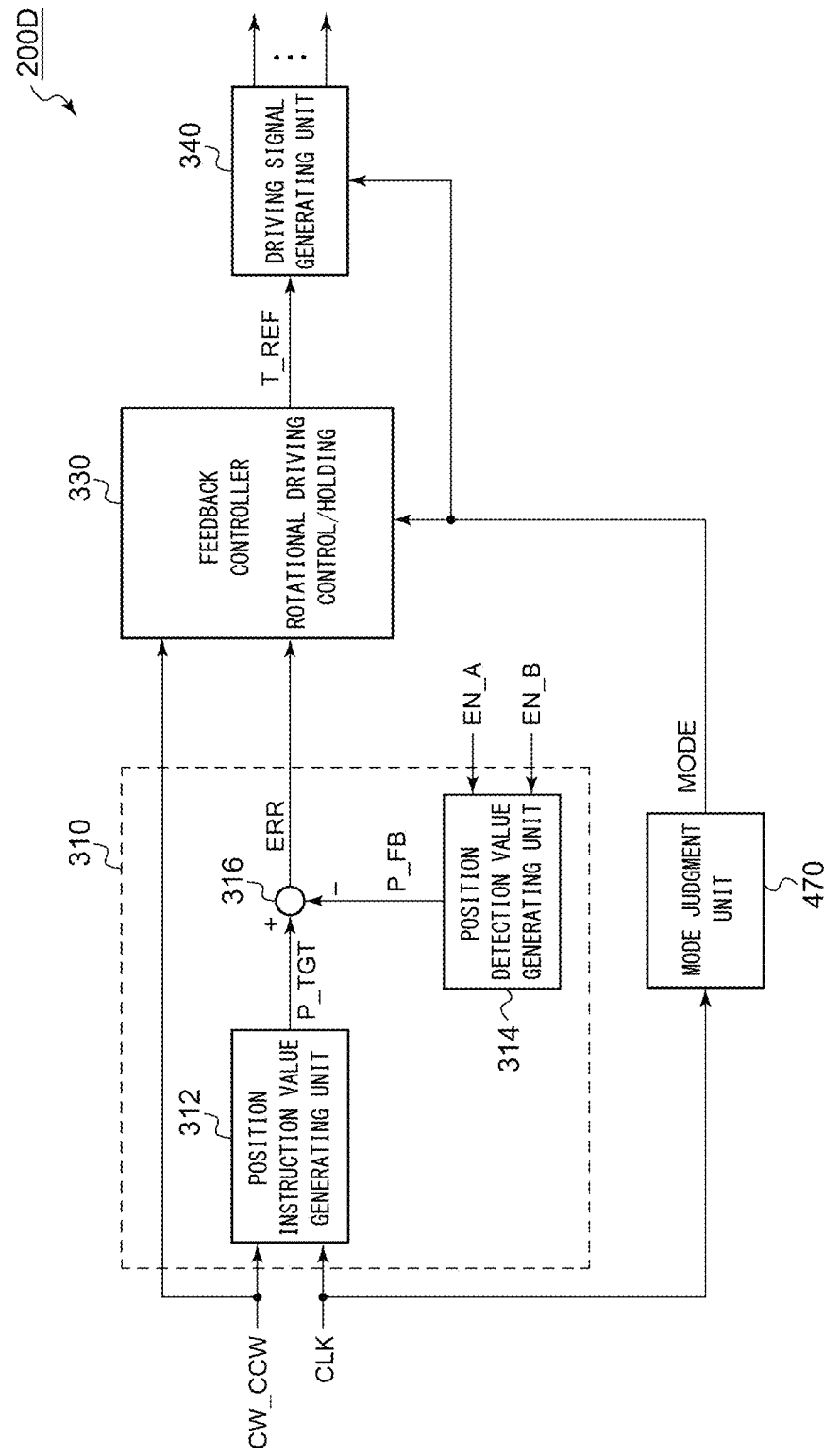
FIG. 7 is a block diagram showing a driving IC that supports switching between a rotational driving control mode and a holding mode.

FIG. 7 is a block diagram showing a driving IC 200D that supports switching between the rotational driving control mode and the holding mode.

The driving IC 200D further includes a mode judgment unit 470 in addition to the error detector 310, the feedback controller 330, and the driving signal generating unit 340. Description has already been made with reference to FIG. 4 regarding the basic functions and the basic operations of the error detector 310, the feedback controller 330, and the driving signal generating unit 340.

The error detector 310 includes the position instruction value generating unit 312, the position detection value generating unit 314, and the subtractor 316. The position instruction value generating unit 312 generates a position instruction value P_TGT indicative of the rotor target position based on the clock signal CLK. The position instruction value P_TGT corresponds to the position instruction value TGT shown in FIG. 4.

The position detection value generating unit 314 generates a position detection value P_FB indicative of the current position of the rotor based on the pulse signals EN_A and EN_B received from the encoder. The position detection value P_FB corresponds to the feedback value FB shown in FIG. 4.

The position instruction value P_TGT and the position detection value P_FB are input to the subtractor 316 so as to generate the position error value ERR.

The feedback controller 330 generates a torque instruction value T_REF such that the position detection value P_FB approaches the position instruction value P_TGT, i.e., such that the position error value ERR approaches zero. The torque instruction value T_REF corresponds to the instruction value REF shown in FIG. 4. The torque instruction value T_REF is supplied to the driving signal generating unit 340.

The driving IC 200D is configured to be switchable between the rotational driving control mode and the holding mode. The control characteristics of the feedback controller 330 are switched according to switching between the rotational driving control mode and the holding mode.

As described above, the feedback controller 330 may include a PI (Proportional Integral) controller. At least one from among the proportional gain $K_P$ and the integral gain $K_I$, or preferably, both of them, are switched according to switching between the rotational driving control mode and the holding mode.

Typically, the proportional gain $K_P$ to be set for the holding mode is designed to be equal to or smaller than that to be set for the rotational driving control mode. Furthermore, the integral gain $K_I$ to be set for the holding mode is designed to be equal to or smaller than that to be set for the rotational driving control mode.

The mode judgment unit 470 judges whether the mode is to be set to the rotational driving control mode or the holding mode based on the input state of the clock signal CK. When a non-input state in which the clock signal CK is not input continues for a predetermined period of time, the mode judgment unit 470 switches the mode from the rotational driving control mode to the holding mode. Furthermore, upon detecting an edge of the clock signal CLK in the holding mode, the mode judgment unit 470 immediately switches the mode to the rotational driving control mode.

The above is the basic configuration of the driving IC 200D. With the driving IC 200D, in the rotational driving control mode, this arrangement allows a control parameter to be supplied prioritizing responsiveness for the rotation instruction generated based on the clock signal CLK. In contrast, in the holding mode, this arrangement allows such a control parameter to be supplied prioritizing stability instead of responsiveness. This allows the DC motor to be driven in the same manner as a stepping motor.

When the mode is switched between the rotational driving control mode and the holding mode, the integrated value stored in the PI controller is preferably reset to zero. This arrangement is capable of suppressing unnecessary oscillation involved in the switching of the control parameter and of suppressing an increase in the stabilization time.

Also, there may be a difference in the operation of the driving signal generating unit 340 (energization logic 344), i.e., the generating method for the driving signal, between the rotational driving control mode and the holding mode.

For example, in the rotational driving control mode, the driving signal generating unit 340 determines the rotational direction according to the CW_CCW signal. When the torque instruction value T_REF is a positive value, the driving signal generating unit 340 PWM drives the DC motor with a duty ratio that corresponds to the torque instruction value T_REF. When the torque instruction value T_REF is a negative value, the driving signal generating unit 340 sets the driver 106 to the high-impedance state so as to perform an idling control operation.

Furthermore, in the holding mode, the driving signal generating unit 340 determines the rotational direction according to the sign (positive or negative) of the torque instruction value T_REF regardless of the CW_CCW signal. This allows the position of the rotor to be fixed with high precision.

Figure 8:
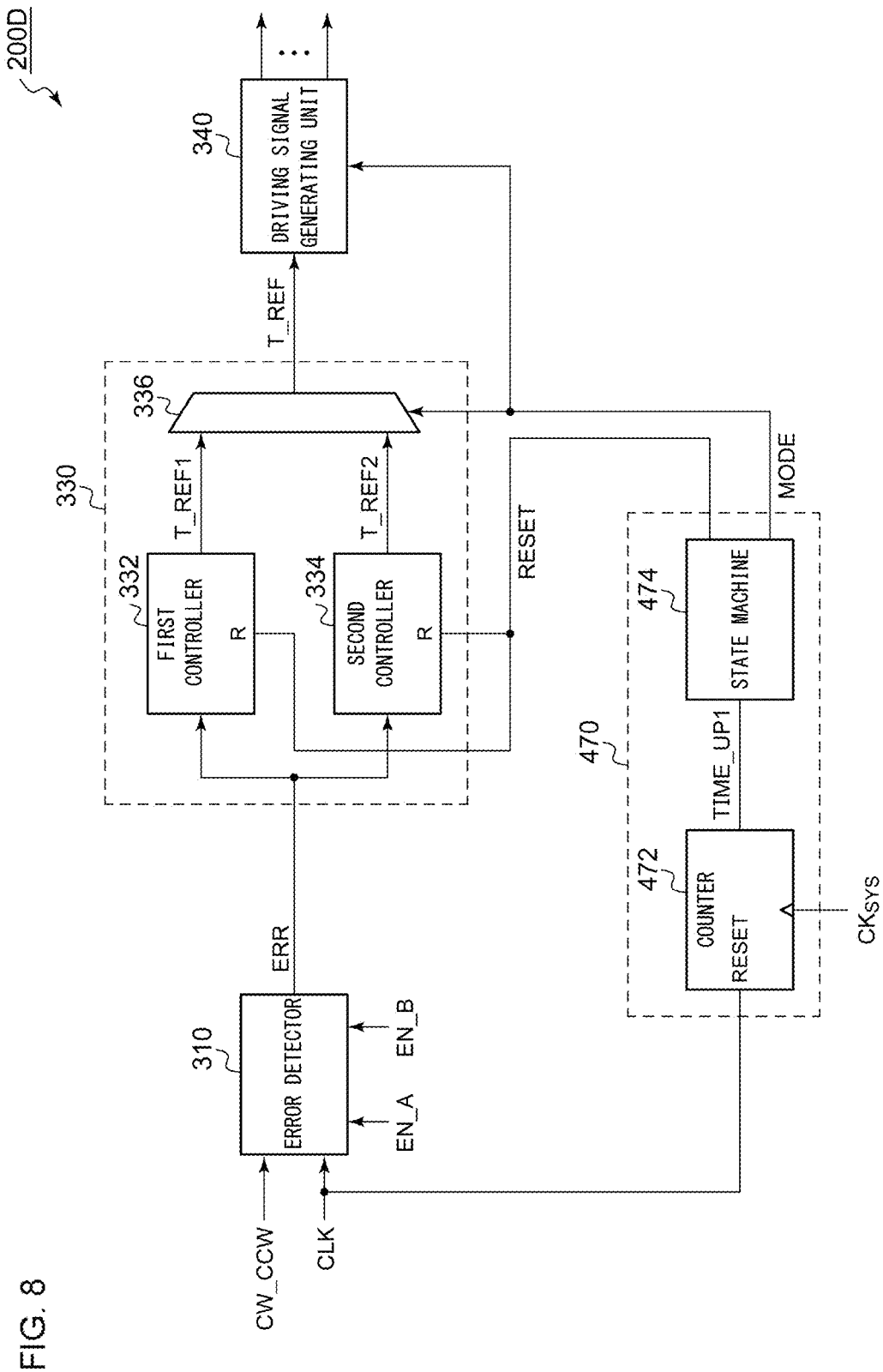
FIG. 8 is a block diagram showing an example configuration of a driving IC.

FIG. 8 is a block diagram showing an example configuration of the driving IC 200D. For example, the mode judgment unit 470 includes a counter 472 and a state machine 474. The counter 472 measures the time duration of the non-input state of the clock signal CLK. When the non-input time exceeds a predetermined time $\tau_1$, the counter 472 asserts (sets to the high level, for example) a time-up signal TIMEUP1.

The configuration of the counter 472 is not restricted in particular. For example, the counter 472 may be configured as a free-running counter configured to be reset by a positive edge of the clock signal CLK. When the count value reaches a threshold value $TH_1$ that corresponds to the judgment time $\tau_1$ (overflow state), the counter 472 asserts the time-up signal TIMEUP1.

The state machine 474 transits to the holding mode in response to an assertion of the time-up signal TIMEUP1. Furthermore, upon detecting an edge of the clock signal CLK in the holding mode, the state machine 474 immediately transits to the rotational driving control mode.

The feedback controller 330 includes a first controller 332, a second controller 334, and a selector 336. The first controller 332 relates to the rotational driving control mode, and generates a torque instruction value T_REF1. The second controller 334 relates to the holding mode, and generates a torque instruction value T_REF2. As described above, there is a difference in at least one setting value from among the proportional gain and the integral gain between the first controller 332 and the second controller 334.

The selector 336 receives the torque instruction values T_REF1 and T_REF2, selects one that corresponds to the current mode from among the torque instruction values thus received, and supplies the selected torque instruction value as T_REF to the driving signal generating unit 340 configured as a downstream stage.

Furthermore, the state machine 474 outputs a reset signal RESET for every mode transition. The first controller 332 and the second controller 334 each reset its integrated value to zero in response to the reset signal RESET.

During the holding mode, the first controller 332 may be suspended or otherwise may continue the driving operation. Furthermore, during the rotational driving mode, the second controller 334 may be suspended or otherwise may continue the driving operation.

As shown in FIG. 8, by providing the controller 332 and 334 in the form of two systems, this arrangement is capable of switching the mode between the rotational driving control mode and the holding mode in a seamless manner.

Figure 9:
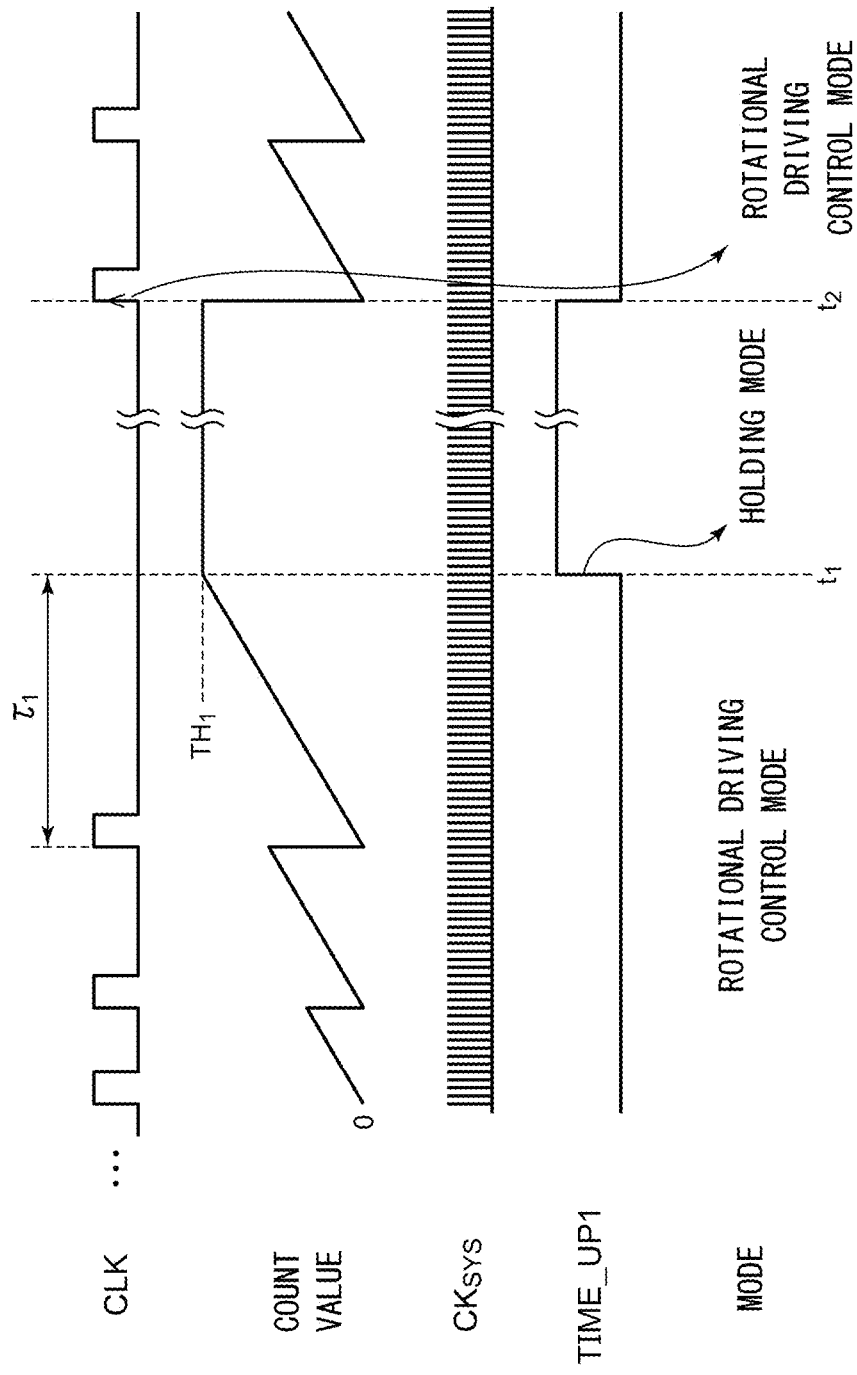
FIG. 9 is a time chart for explaining mode transition of the driving IC shown in FIG. 8.

FIG. 9 is a time chart for explaining the mode transition of the driving IC 200D shown in FIG. 8. During a period in which the clock signal CLK is input, the rotational driving control mode is selected. In this mode, the DC motor is controlled according to the torque instruction value T_REF1 generated by the first controller 332.

The counter 472 operates in a free-running manner using the internal clock $CK_{SYS}$ generated by an oscillator built into the driving IC 200D. When the clock signal CLK is suspended, the counter 427 continues its count-up operation without being reset. When the count value reaches a threshold value $TH_1$ at the time point $\tau_1$, the time-up signal TIMEUP1 is asserted, which switches the mode to the holding mode.

In the holding mode, the DC motor is controlled according to the torque instruction value T_REF2 generated by the second controller 334.

When the clock signal CLK is input again from the host controller at the time point $t_2$, the mode is returned to the rotational driving control mode. In this mode, the DC motor is controlled according to the torque instruction value T_REF1 generated by the first controller 332.

Description will be made regarding modifications for switching the mode between the rotational driving control mode and the holding mode.

Modification 1

Description has been made above regarding an arrangement in which the gain of the PI controller is switched according to the switching between the rotational driving control mode and the holding mode. However, the present invention is not restricted to such an arrangement. For example, the control method may be switched between different control methods (P control method, PI control method, PID control method) according to the switching between the rotational driving control mode and the holding mode.

Modification 2

The calculation period (ΔT) may be switched between different periods according to the switching between the rotational driving control mode and the holding mode. That is to say, in the holding mode, the calculation period ΔT may be switched to a long period. In contrast, in the rotational driving control mode, the calculation period ΔT may be switched to a short period.

Modification 3

In a case in which the driving IC 200D supports a suspension mode described later, and is provided with a counter 450 (FIG. 11) described later, the counter 472 may also function as the counter 450. Also, the judgment time $\tau_1$ employed in the counter 472 may be designed to be equal to or smaller than the judgment time $\tau_2$ employed in the counter 450.

Modification 4

Figure 10:
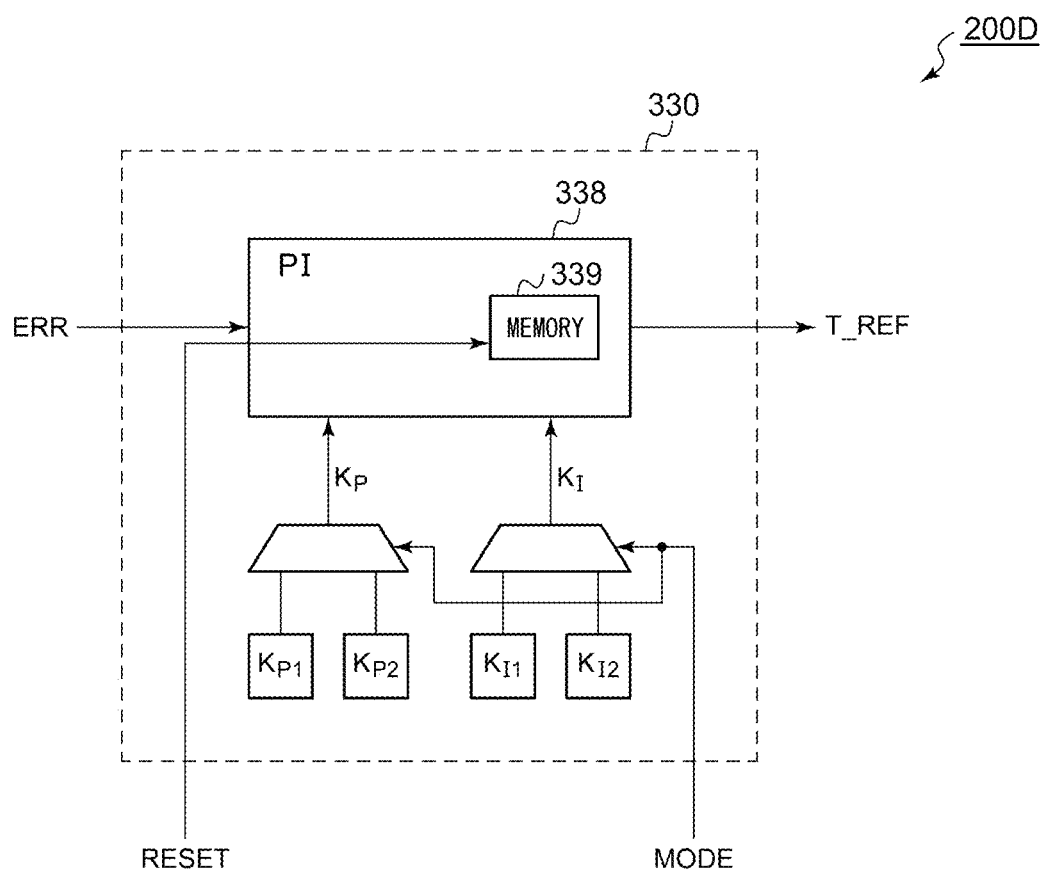
FIG. 10 is a block diagram showing a part of a driving IC according to a modification 4.

FIG. 10 is a block diagram showing a part of the driving IC 200D according to a modification 4. In this modification, the feedback controller 330 includes a single PI controller 338. As the proportional gain $K_P$ and the integral gain $K_I$ to be set for the PI controller 338, $K_{P1}$ and $K_{I1}$ values for the rotational driving control mode and $K_{P2}$ and $K_{I2}$ values for the holding mode are separately prepared. The $K_P$ and $K_I$ values that correspond to a mode instruction received by the mode judgment unit 470 are loaded to the PI controller 338, thereby changing the gains. Furthermore, the integrated value stored in memory 339 included in the PI controller 338 is set to zero according to a reset signal RESET generated by the mode judgment unit 470.

Modification 5

Description has been made regarding an arrangement in which the mode is switched based on the presence or absence of the clock signal CLK. However, the present invention is not restricted to such an arrangement. Also, a mode instruction signal may be supplied from the host controller to the driving IC 200D. The driving IC 200D may switch the mode according to the mode instruction signal thus received.

Suspension Mode

Figure 11:
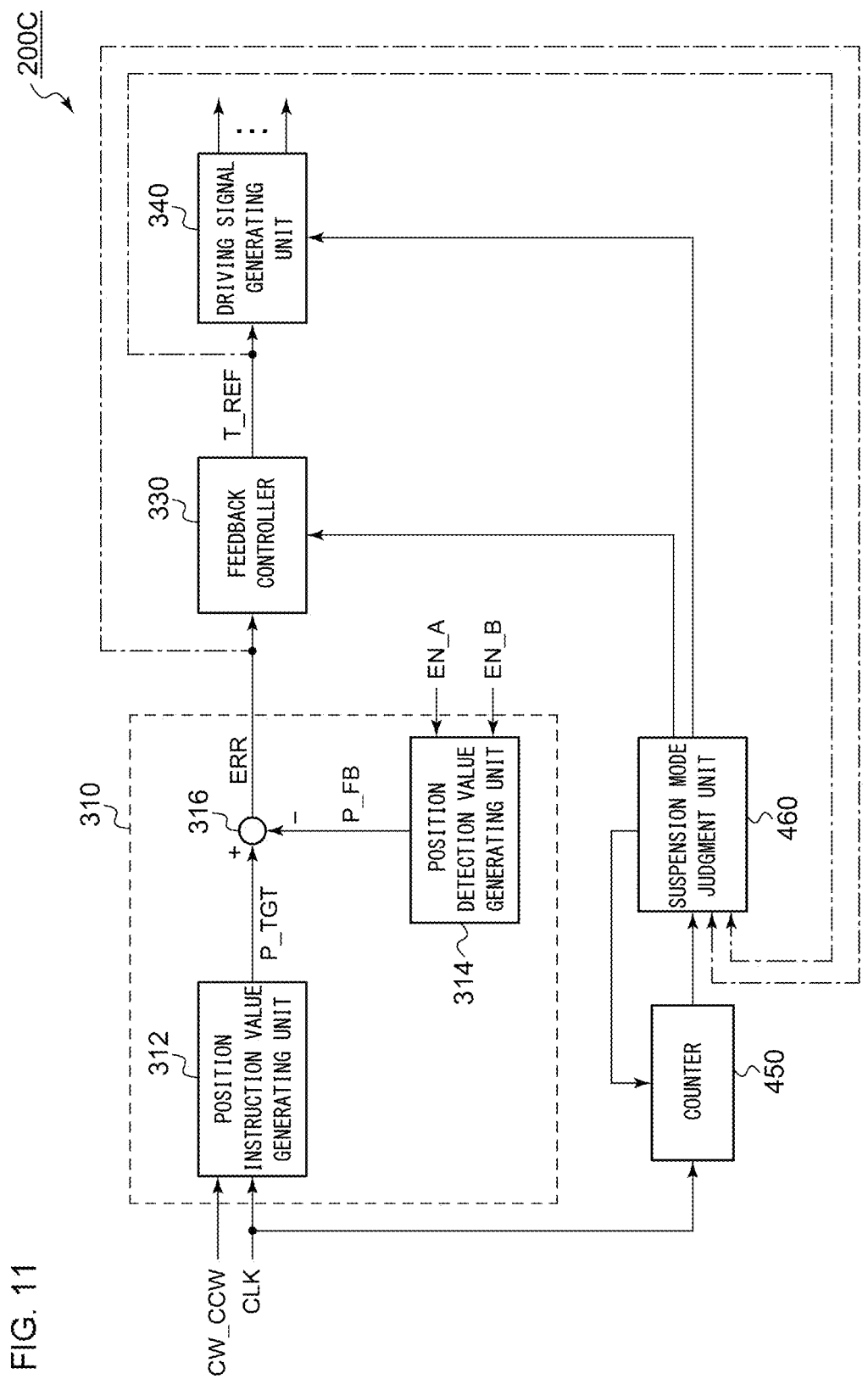
FIG. 11 is a block diagram showing a part of a driving IC that supports a suspension mode.

FIG. 11 is a block diagram showing a part of a driving IC 200C that supports a suspension mode. The driving IC 200C further includes a counter 450 and a suspension mode judgment unit 460 in addition to the error detector 310, the feedback controller 330, and the driving signal generating unit 340. Description has been already made with reference to FIG. 4 regarding the main functions and operations of the error detector 310, the feedback controller 330, and the driving signal generating unit 340.

The error detector 310 includes the position instruction value generating unit 312, the position detection value generating unit 314, and the subtractor 316. The position instruction value generating unit 312 generates the position instruction value P_TGT indicative of the target position of the rotor based on the clock signal CLK. The position instruction value P_TGT corresponds to the position instruction value TGT shown in FIG. 4.

The position detection value generating unit 314 generates the position detection value P_FB indicative of the current position of the rotor based on the pulse signals EN_A and EN_B received from the encoder. The position detection value P_FB corresponds to the feedback value shown in FIG. 4.

The position instruction value P_TGT and the position detection value P_FB are input to the subtractor 316 so as to generate the position error value ERR.

The feedback controller 330 generates the torque instruction value T_REF such that the position detection value P_FB approaches the position instruction value P_TGT, i.e., such that the position error value ERR approaches zero. The torque instruction value T_REF corresponds to the instruction value REF shown in FIG. 4. The torque instruction value T_REF is supplied to the driving signal generating unit 340.

In a situation in which there is no need to rotate the DC motor, the supply of the clock signal CLK from the host controller is suspended. Accordingly, when the non-input state of the clock signal CLK has continued for a predetermined time (which will be referred to as "judgment time $\tau_2$"), which is used as a mode switching condition, the driving IC 200C transits to a suspension mode in which the operation of at least a part of the circuit block thereof is suspended. An arrangement may be made in which the judgment time can be set using a register.

The counter 450 receives the clock signal CLK. When the non-input state of the clock signal CLK has continued for the judgment time $\tau_2$, the counter 450 asserts (sets to the high level, for example) a time-up signal TIMEUP2. As the counter 450, another counter, which is provided in order to support another function that differs from the function of detecting the non-input state of the clock signal CLK, may also be used.

The configuration of the counter 450 is not restricted in particular. For example, the counter 450 may be configured as a free-running counter configured to be reset by a positive edge of the clock signal CLK. When the count value reaches a threshold value $TH_2$ that corresponds to the judgment time (overflow state), the counter 450 asserts the time-up signal TIMEUP2.

The suspension mode judgment unit 460 switches the mode to the suspension mode with an assertion of the time-up signal TIMEUP2 as one of the mode transition conditions.

Figure 12:
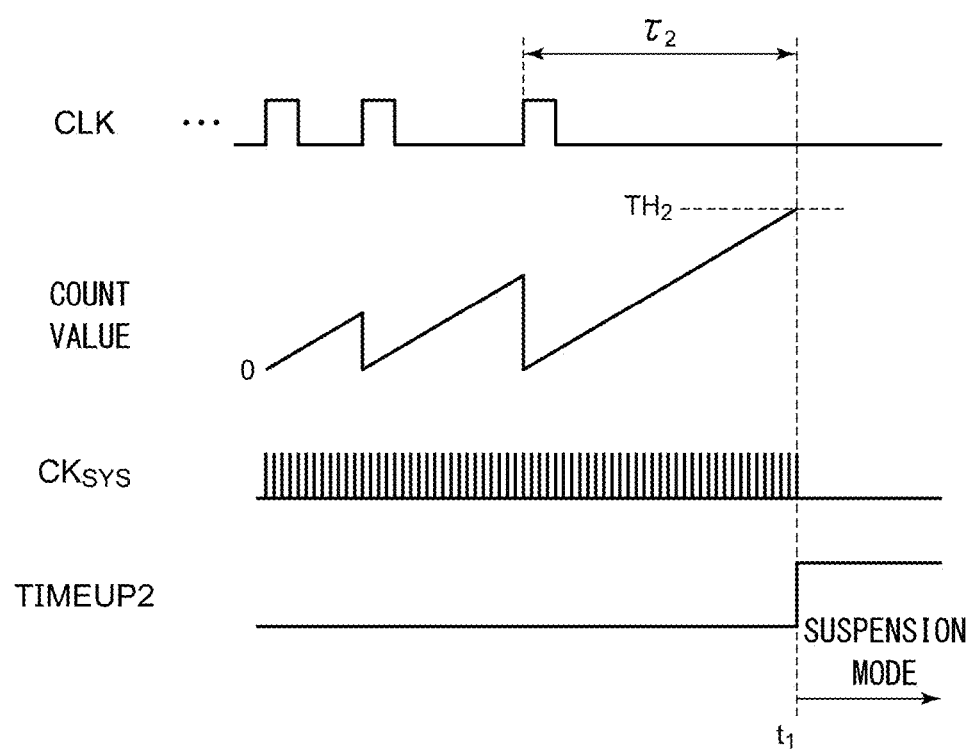
FIG. 12 is a diagram for explaining the transition of the driving IC shown in FIG. 11 to the suspension mode.

FIG. 12 is a time chart for explaining the transition to the suspension mode. The counter 450 operates in a free-running manner using the internal clock $CK_{SYS}$ generated by an oscillator built into the driving IC 200C. When the clock signal CLK is suspended, the counter 450 continues its count-up operation without being reset. When the count value reaches a threshold value TH at the time point $t_1$, the time-up signal TIMEUP2 is asserted, which switches the mode to the suspension mode.

By employing the driving IC 200C, such an arrangement is capable of reducing power consumption of the driving IC 200C in a state in which the suspension of the DC motor is to be maintained.

In the suspension mode, this arrangement is capable of suspending the operation of the counter 450. In a case in which the counter 450 continues its operation in a free-running manner, this arrangement involves unnecessary power consumption. However, after the mode is temporarily switched to the suspension mode, there is no need to measure the non-input state of the clock signal CLK. Accordingly, in this state, by suspending the operation of the counter 450, this arrangement is capable of reducing power consumption.

In a case in which the system clock $CK_{SYS}$ is not used in the suspension mode, the operation of the oscillator (oscillator 288 shown in FIG. 2) configured to generate the system clock $CK_{SYS}$ may further be suspended.

When the suspension state of the DC motor has continued, in a case in which a servo control operation is continued, i.e., in a case in which the operations of the feedback controller 330 and the driving signal generating unit 340 are not suspended, this arrangement involves unnecessary power consumption. In order to solve such a problem, in the suspension mode, the driving IC 200C may preferably suspend the supply of electric power to the DC motor. In this case, by suspending the operations of the feedback controller 330 and the driving signal generating unit 340, this arrangement is capable of further reducing power consumption.

It should be noted that, with an application where an external force may be applied to the DC motor, when a such an external force is applied in a state in which the servo control operation is suspended, in some cases, unintended rotation occurs in the rotor, leading to deviation from the target position indicated by the position instruction value P_TGT. In this case, the DC motor is required to be driven so as to be returned to the target position. In order to solve such a problem, the suspension mode judgment unit 460 may monitor the position error value ERR. The suspension mode judgment unit 460 may switch the mode to the suspension mode when a condition that the position error value ERR is zero is satisfied in addition to satisfaction of the condition that the non-input state of the clock signal CLK has continued for a predetermined time. In a situation in which a torque is not required to be generated in the suspension mode, the operations of the feedback controller 330 and the driving signal generating unit 340 may further be suspended.

When the position error signal ERR is zero, the DC motor is not required to be driven from the current position. Accordingly, in this case, other unnecessary circuit blocks may be suspended.

With an example, when the clock signal CLK is not input and when the position error value ERR remains zero for a predetermined time, the mode may be switched to the suspension mode.

With an example, in a period in which the position error value ERR is zero after the state in which the clock signal CLK is not input has continued for a first period of time, the mode may be set to the suspension mode.

With an example, when the state in which the position error value ERR is zero has continued for a second period of time after the state in which the clock signal CLK is not input has continued for a first period of time, the mode may be switched to the suspension mode.

With an example, the suspension mode judgement unit 460 may monitor the torque instruction value T_REF in addition to or otherwise instead of the position error value ERR. When the state in which the position error value ERR is zero continues, eventually, the torque instruction value T_REF becomes zero. Accordingly, the suspension mode judgment unit 460 may monitor the torque instruction value T_REF. When a condition that the torque instruction value T_REF is zero is satisfied in addition to satisfaction of the condition that the non-input state of the clock signal CLK has continued for a predetermined time, the suspension mode judgment unit 460 may switch the mode to the suspension mode, and may suspend the operations of the feedback controller 330 and the driving signal generating unit 340.

With an example, when the clock signal CLK is not input, and when the state in which the torque instruction value T_REF is zero has continued for a predetermined time, the mode is switched to the suspension mode, and the operations of the feedback controller 330 and the driving signal generating unit 340 are suspended.

With an example, in a period in which the torque instruction value T_REF is zero after the non-input state of the clock signal CLK has continued for a first period of time, the operations of the feedback controller 330 and the driving signal generating unit 340 may be suspended.

With an example, when the state in which the torque instruction value T_REF is zero has continued for a second period of time after the non-input state of the clock signal CLK has continued for a first period of time, the operations of the feedback controller 330 and the driving signal generating unit 340 may be suspended.

With an example, when a condition that both the torque instruction value T_REF and the position error value ERR are zero is satisfied, the mode may be switched to the suspension mode.

Also, during the suspension mode, the operation of the error detector 310 may be suspended in addition to that of the feedback controller 330 and the driving signal generating unit 340. This allows power consumption to be further reduced.

In some cases, the driving IC 200C is provided with a circuit (speed instruction value generating unit 414 shown in FIG. 13) that detects a speed instruction value based on the frequency (period) of the clock signal CLK or a circuit (speed detection value generating unit 424 shown in FIG. 13) that detects the current rotational speed of the motor based on the frequencies (periods) of the pulse signals EN_A and EN_B received from the encoder, which are not shown in FIG. 11. In this case, the operations of such detection circuits may be suspended during the suspension mode.

Next, description will be made regarding an operation for returning from the suspension mode to the normal mode.

Upon detecting the input of the clock signal CLK in the suspension mode, the driving IC 200C immediately returns the mode to the normal mode.

Also, when a condition that the position error value ERR or otherwise the torque instruction value T_REF becomes a non-zero value is satisfied, the driving IC 200C may immediately return the mode to the normal mode.

In the mode returning operation, at least one from among the speed instruction value and the torque instruction value is preferably resettable to a desired value. This allows the rotational speed or the torque to be set freely immediately after the mode is returned to the normal mode, thereby allowing the DC motor to be smoothly restarted.

Short Brake

Figure 13:
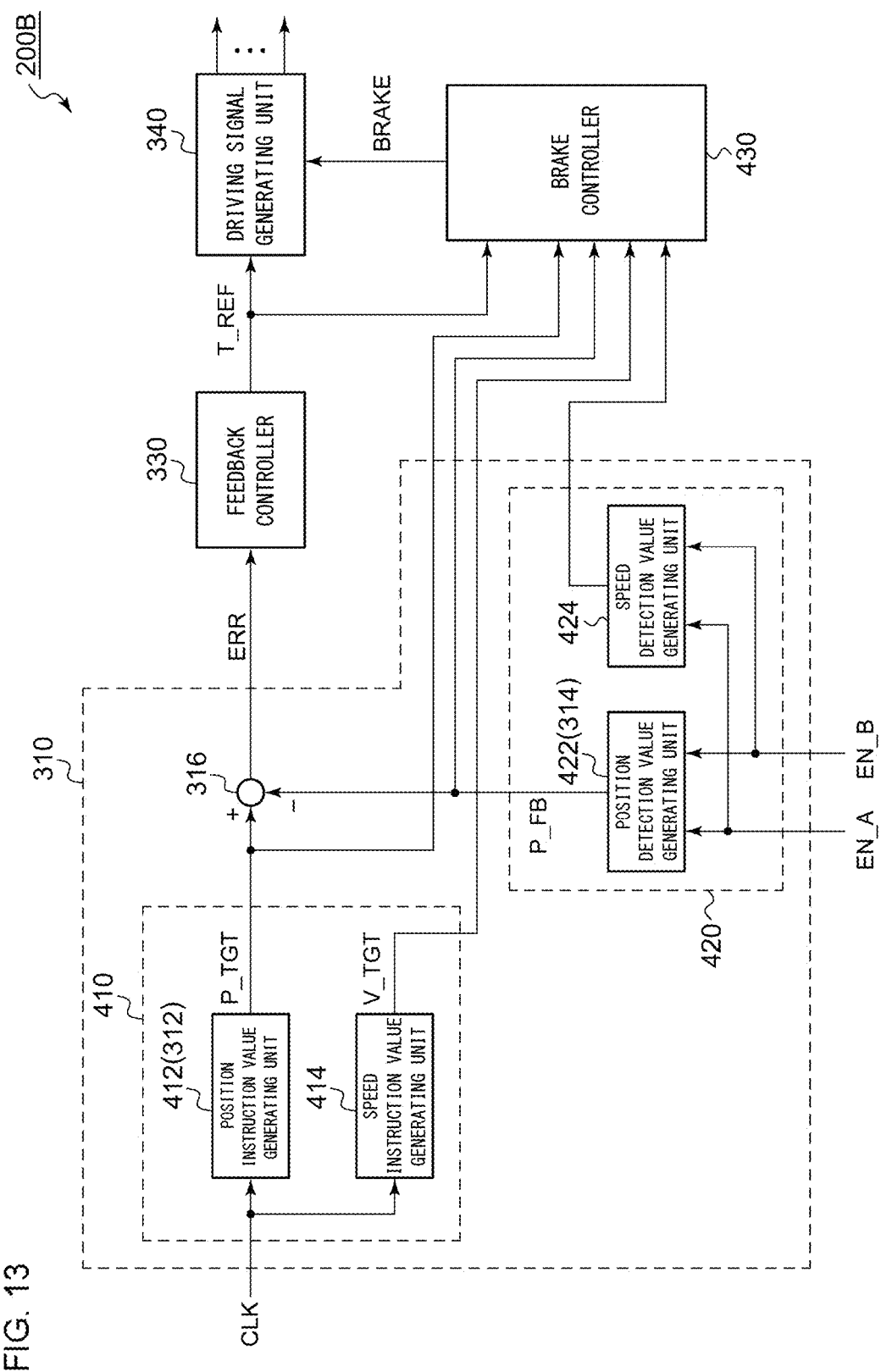
FIG. 13 is a block diagram showing a part of a driving IC including a short brake function.

FIG. 13 is a block diagram showing a part of a driving IC 200B having a short brake function. The driving IC 200B further includes a brake controller 430 in addition to the error detector 310B, the feedback controller 330, and the driving signal generating unit 340. Description has already been made with reference to FIG. 4 regarding the main functions and main operations of the error detector 310, the feedback controller 330, and the driving signal generating unit 340.

The error detector 310B includes a first detection circuit 410, a second detection circuit 420, and a subtractor 316. The first detection circuit 410 generates the position instruction value P_TGT indicative of the target position of the rotor and the speed instruction value V_TGT indicative of the target rotational speed based on the clock signal CLK. The position instruction value P_TGT corresponds to the position instruction value TGT shown in FIG. 4. The speed instruction value V_TGT is designed to be in proportion to the frequency of the clock signal CLK, i.e., to be in inverse proportion to the period of the clock signal CLK.

The second detection circuit 420 generates the position detection value P_FB indicative of the current position of the rotor and the speed detection value V_FB indicative of the current rotational speed of the rotor based on the pulse signals EN_A and EN_B received from the encoder. The position detection value P_FB is indicated simply by the "feedback value FB" in FIG. 4. The speed detection value V_FB is configured to be in proportion to the frequencies of the pulse signals EN_A and EN_B, i.e., to be in inverse proportion to the periods of the pulse signals EN_A and EN_B.

The position instruction value P_TGT and the position detection value P_FB are input to the subtractor 316 so as to generate the position error value ERR. Furthermore, the position instruction value P_TGT and the position detection value P_FB are supplied to the brake controller 430 together with the speed instruction value V_TGT and the speed detection value V_FB.

The feedback controller 330 generates the torque instruction value T_REF such that the position detection value P_FB approaches the position instruction value P_TGT, i.e., such that the position error value ERR approaches zero. The torque instruction value T_REF corresponds to the instruction value REF shown in FIG. 4. The torque instruction value T_REF is supplied to the driving signal generating unit 340 and the brake controller 430.

The brake controller 430 executes a brake control operation based on the position detection value P_FB, the position instruction value P_TGT, the speed detection value V_FB, the speed instruction value V_TGT, and the torque instruction value T_REF.

Specifically, when the position detection value P_FB is larger than the position instruction value P_TGT (i.e., when an over-position state has occurred), when the speed detection value V_FB is larger than the speed instruction value V_TGT (i.e., when an over-speed state has occurred), and when the torque instruction value T_REF is a negative value, the brake signal BRAKE is asserted (set to the high level, for example), which instructs the driving signal generating unit 340 to perform a short brake operation.

When the conditions for executing the short brake operation are not all satisfied, i.e., when the torque is a negative value and an over-position state has not occurred, the output of the driver 106 is set to the high-impedance state (idling control operation).

The three conditions for executing the brake operation will be listed below.
Condition 1: Over-position state P_FB>P_TGT
Condition 2: Over-speed state V_FB>V_TGT
Condition 3: T_REF<0

It should be noted that the conditions may be designed as follows giving consideration to margins.
Condition 1: Over-position state P_FB>P_TGT+ΔP
Condition 2: Over-speed state V_FB>V_TGT+ΔV
Condition 3: T_REF<−ΔT Here, ΔP, ΔV, and ΔT each represents a margin.

Figure 14:
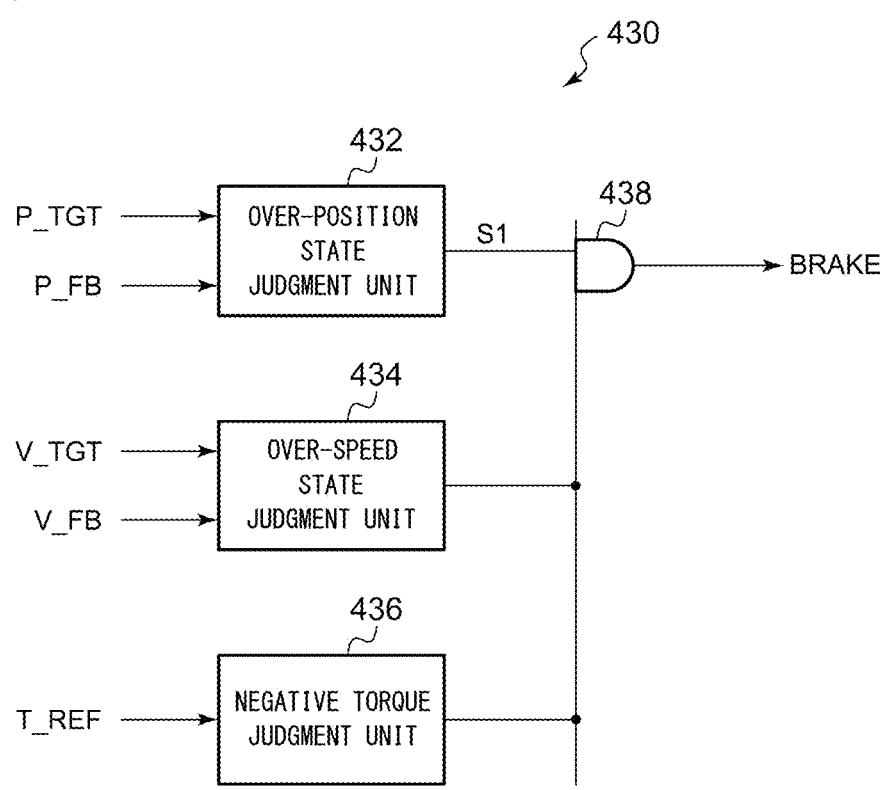
FIG. 14 is a block diagram showing a brake controller.

FIG. 14 is a block diagram showing the brake controller 430. The brake controller 430 may include an over-position state judgment unit 432, an over-speed state judgment unit 434, a negative torque judgement unit 436, and a logic gate 438.

When the condition 1 is satisfied, the over-position state judgment unit 432 asserts (sets to the high level, for example) an over-position state signal S1. When the condition 2 is satisfied, the over-speed state judgement unit 434 asserts an over-speed state signal S2. When the condition 3 is satisfied, the negative torque state judgment unit 436 asserts a negative torque judgment signal S3. The logic gate 438 is configured as an AND gate, for example. When the three conditions hold true at the same time, the logic gate 438 asserts the brake signal BRAKE.

Figure 15A:
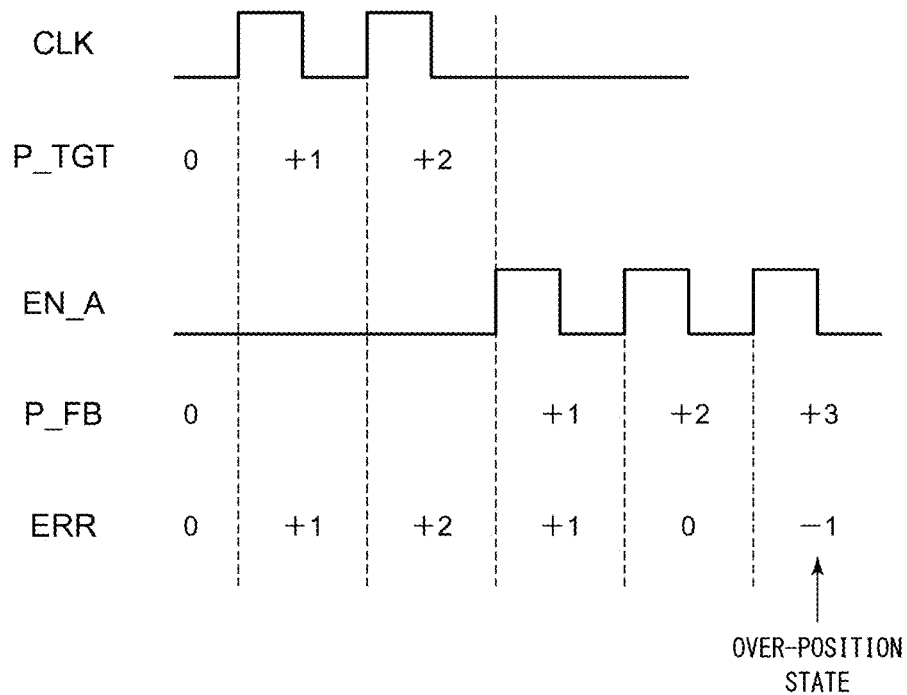
FIGS. 15A and 15B are diagrams for explaining the operation of the brake controller.
Figure 15B:
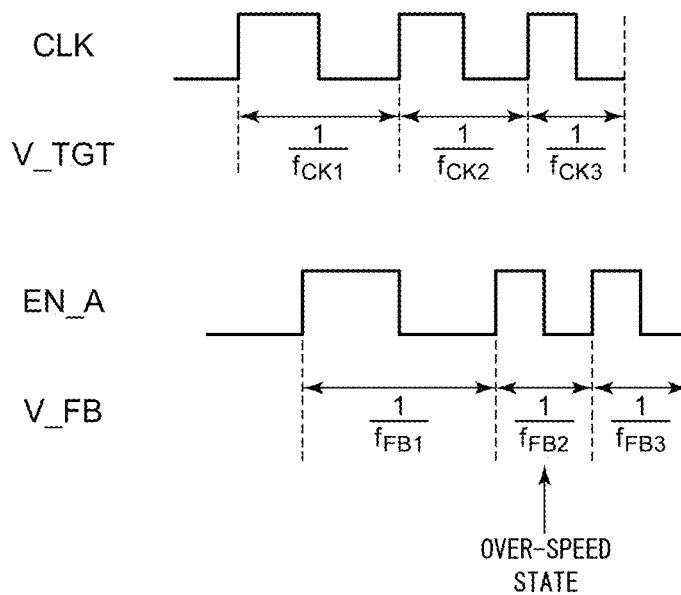

FIGS. 15A and 15B are diagrams for explaining the operation of the brake controller 430. First, description will be made with reference to FIG. 15A regarding an operation for the over-position state. For simplification of description, description will be made regarding an example in which both the position instruction value P_TGT and the position detection value P_FB are zero in the initial state. The position instruction value P_TGT is incremented for every positive edge of the clock signal CLK. Furthermore, the position detection value P_FB is incremented for every pulse of the pulse signal EN_A (EN_B). When P_FB>P_TGT holds true, i.e., when ERR<0 holds true, the over-position state judgement unit 432 asserts the over-position state signal S1. The occurrence of the over-position state may be detected based on the position error value ERR which is the output of the subtractor 316.

Description will be made with reference to FIG. 15B regarding an operation for the over-speed state. The speed instruction value V_TGT is designed to be in proportion to the frequency $f_{CK}$ of the clock signal, i.e., in inverse proportion to the period $1/f_{CK}$ of the clock signal CLK. Similarly, the speed detection value V_FB is designed to be in proportion to the frequency $f_{FB}$ of the pulse signal EN_A received from the encoder, i.e., in inverse proportion to the period $1/f_{FB}$ of the pulse signal EN_A. The over-speed state judgment unit 434 makes a comparison between a pair of the corresponding frequencies $f_{CK}$ and $f_{FB}$, i.e., between a pair of the corresponding periods $1/f_{CK}$ and $1/f_{FB}$ for each cycle. When $f_{FB} > f_{CK}$ holds true, i.e., when $1/f_{FB} < 1/f_{CK}$ holds true, the over-speed state judgment unit 434 asserts the over-speed state signal S2.

Returning to FIG. 13, description will be made. In response to an assertion of the brake signal BRAKE, the driving signal generating unit 340 switches the driving signals SUH, SUL, SVH, SVL, SWH, and SWL, such that the high-side transistors of the U-phase, V-phase, and W-phase are all turned on, and the low-side transistors thereof are all turned off (or otherwise, conversely, such that the low-side transistors of the U-phase, V-phase, and W-phase are all turned on, and the high-side transistors thereof are all turned off).

The above is the configuration of the driving IC 200B.

With the motor driving system 100, reduction in the frequency of the clock signal CLK received from the host controller signifies an instruction to reduce the rotational speed. Instead of employing such a reduction in the frequency of the clock signal CLK as a brake trigger condition, when the aforementioned conditions 1, 2, and 3 are satisfied, the driving IC 200B executes a brake operation. This allows the rotational speed of the DC motor to be reduced with high precision.

It should be noted that, instead of making judgment regarding whether or not all the conditions 1 through 3 are satisfied, when judgment has been made that the conditions 1 and 3 are satisfied, i.e., when judgment is made that an over-position state has occurred and the torque is a negative value, the brake operation may be executed. In this case, generating circuits for generating the speed instruction value and the speed detection value may be omitted.

PI Controller

With a platform where a stepping motor is driven, in a case in which the frequency of the clock signal CLK that corresponds to an instruction value for setting the rotational speed of the motor is suddenly set to a high value when the stepping motor is to be rotationally driven from a suspension state, such an arrangement has the potential to cause an out-of-step state.

In order to solve such a problem, in many platforms, when the rotational driving of the stepping motor is to be started, the frequency of the clock signal CLK is slowly raised with time. Conversely, when the stepping motor in a constant rotational driving state is to be suspended, in many cases, the frequency of the clock signal CLK (which will be refereed as the "clock frequency $f_{CK}$") is slowly lowered with time. Accordingly, in many cases, the clock frequency $f_{CK}$ is changed according to a trapezoidal waveform or a wave similar to such a trapezoidal waveform (which will simply be referred to as a "trapezoidal waveform" hereafter) for each cycle configured of a suspension state, a constant rotational driving state, and a suspension state of the stepping motor.

Figure 16:
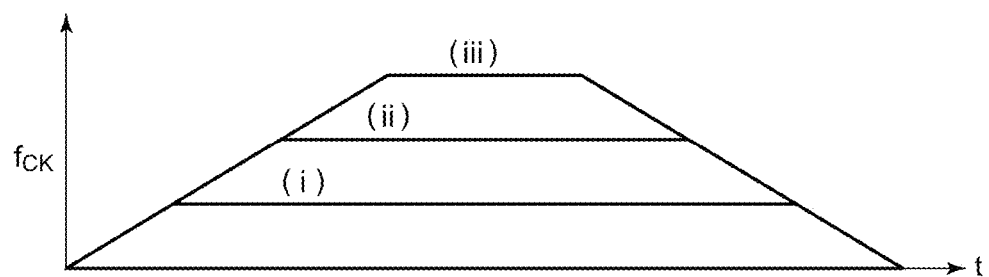
FIG. 16 is a waveform diagram showing the operation with a clock signal CLK having a frequency $f_{CK}$.

With the platform where such a stepping motor is replaced by a DC motor as in the present embodiment, it can be assumed that the clock signal $f_{CK}$ received from the host controller 104 is also changed according to a trapezoidal waveform. FIG. 16 is a waveform diagram showing the frequency $f_{CK}$ of the clock signal CLK. The reference symbols (i) through (iii) indicate waveforms for providing different respective rotational speeds in a constant rotational driving state.

As described above, the feedback controller 330 includes a PI controller having control characteristics determined by the proportional gain $K_P$ and the integral gain $K_I$. The feedback controller 330 according to the embodiment dynamically changes the control characteristics (at least one from among the proportional gain and the integral gain) according to the clock frequency $f_{CK}$. This arrangement provides improved motor responsiveness as compared with an arrangement employing fixed control characteristics.

The feedback controller 330 includes memory that stores a table that holds the relation between the clock frequency $f_{CK}$ and the control characteristics (proportional gain, integral gain).

More preferably, after the rotational driving of the DC motor is started, during a period in which the clock frequency $f_{CK}$ is raised, only the proportional gain $K_P$ may preferably be changed according to the clock frequency $f_{CK}$ while the integral gain $K_I$ remains at a constant level. The proportional gain $K_P$ may have a positive correspondence with respect to the clock frequency $f_{CK}$. Also, the proportional gain $K_P$ may be monotonically raised according to the clock frequency $f_{CK}$.

Figure 17:
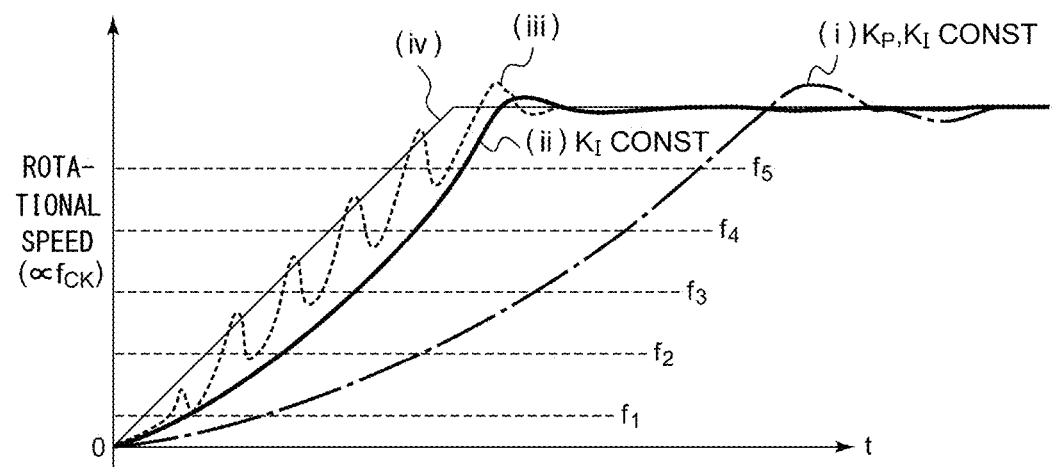
FIG. 17 is a diagram showing the rotational speed of a motor of a motor driving system when it is started up.

FIG. 17 is a diagram showing the rotational speed of the motor when the motor driving system 100 is started up. Here, (i) represents a waveform in a case in which fixed control characteristics are employed, (ii) represents a waveform in a case in which only the proportion gain $K_P$ is changed, and (iii) represents a waveform in a case in which both the proportional gain $K_P$ and the integral gain $K_I$ are changed. In addition, (iv) represents the target rotational speed to be obtained based on the clock frequency $f_{CK}$. The reference symbols "$f_1$", "$f_2$", . . . each represent a threshold value at which the control characteristics are to be switched.

In a case in which fixed control characteristics are employed as represented by (i), such an arrangement requires a long time for the rotational speed to reach the target rotational speed. In contrast, in a case in which both the proportional gain and the integral gain are changed as represented by (iii), this involves an increase in an integral term that represents the integrated value at a timing when the integral gain $K_I$ is switched, leading to a problem of oscillation of the rotational speed (rotational fluctuation). In order to solve such a problem, by employing an arrangement as represented by (ii) in which only the proportional gain is changed while maintaining the integral gain at a constant level, this arrangement provides improved responsiveness while suppressing rotational fluctuation.

Description has been made regarding the operation for raising the rotational speed. Also, in an operation for lowering the rotational speed, the same operation may be employed, i.e., the proportional gain $K_P$ may preferably be changed according to the clock frequency $f_{CK}$ while maintaining the integral gain $K_I$ at a constant level.

Electronic Gear

Next, description will be made regarding an electronic gear. In some cases, depending on the specifications of the host controller 104, this limits the variable range of the frequency $f_{CK}$ of the clock signal CLK. For example, in a case in which the upper limit $f_{MAX}$ of the clock frequency $f_{CK}$ is insufficiently low, the rotational speed of the DC motor is limited by the upper limit $f_{MAX}$. In a case in which the motor is to be rotationally driven with a higher rotational speed than that determined by the upper limit frequency $f_{MAX}$, conventional arrangements require a mechanical gear, leading to an increased cost. In order to solve this problem, the driving IC 200 includes an electronic gear function.

Figure 18:
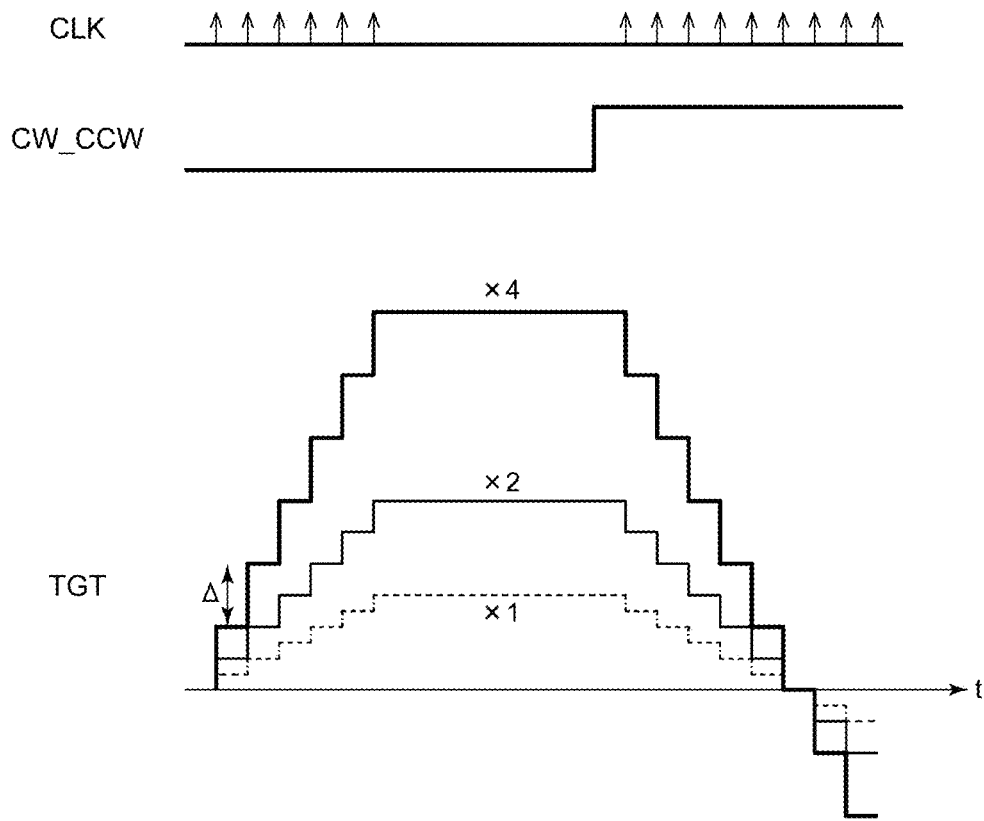
FIG. 18 is a diagram for explaining an electronic gear function.

FIG. 18 is a diagram for explaining a function of the electronic gear. As described above, the position instruction value generating unit 312 integrates the number of edges of the clock signal CLK. In the examples shown in FIGS. 6A through 6C, the target value TGT is incremented or otherwise decremented by 1 for each edge of the clock signal CLK.

In contrast, a logic circuit 300A including the electronic gear allows an external circuit to set a change amount ΔTGT by which the target value TGT is to be incremented or otherwise decremented for each edge of the clock signal CLK. FIG. 18 shows the operations in a case in which the change amount ΔTGT is switched between three change steps, i.e., between 1, 2, and 4.

Such an arrangement allows the rotor rotational angle for each pulse of the clock signal CLK to be controlled according to the change amount ΔTGT. Accordingly, the change amount ΔTGT corresponds to an electronic gear ratio. By implementing the electronic gear function, the number of mechanical gears can be reduced, or otherwise such an arrangement requires no mechanical gear. This provides an apparatus with a low cost and a compact size. Furthermore, such an apparatus requires only a simple configuration, thereby reducing a risk of malfunction.

Figure 19:
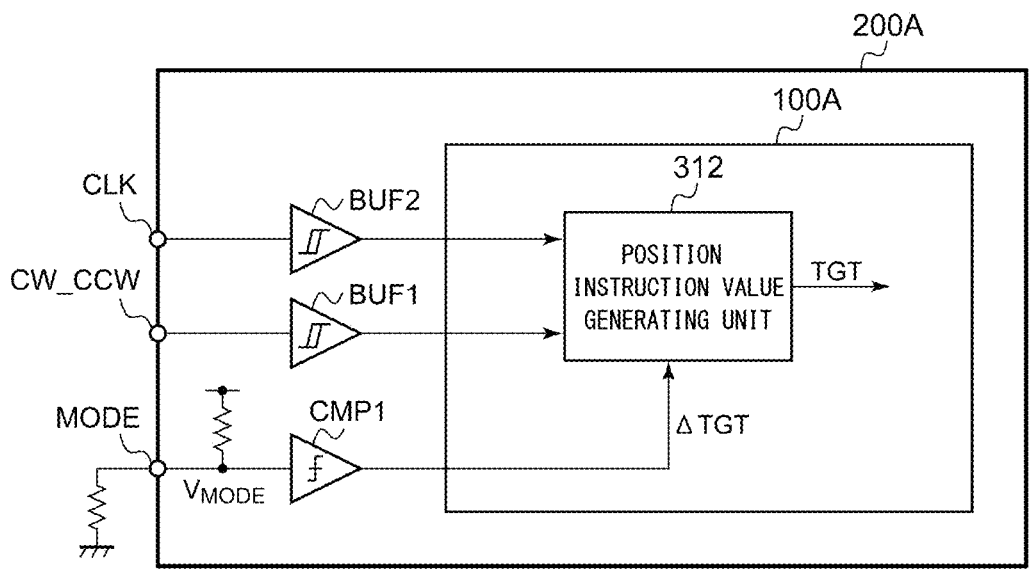
FIG. 19 is a block diagram showing a driving IC having an electronic gear function.

FIG. 19 is a block diagram showing a driving IC 200A including a function of the electronic gear. The driving IC 200A is provided with a setting pin MODE for electronic gear settings. The change amount ΔTGT is selected according to the state of the setting pin MODE. For example, an external resistor can be attached to the setting pin MODE. A voltage $V_{MODE}$ occurs at the setting pin MODE according to the presence or absence of such a resistor or otherwise according to the resistance value of the resistor. The mode voltage $V_{MODE}$ is detected by a comparator CMP1 or an A/D converter (not shown). The change amount ΔTGT that corresponds to the mode voltage $V_{MODE}$ is selected.

More specifically, the electronic gear function can be implemented in the position instruction value generating unit 312. Description will be made with reference to FIGS. 6A through 6C regarding the implantation of the electronic gear function. For example, with the position instruction value generating unit 312 shown in FIG. 6A, the increment step or the decrement step to be set for the counter 322 may preferably be changed according to the state of the setting pin MODE.

With the position instruction value generating unit 312 shown in FIG. 6B, the value to be input to the input A of the calculation unit 324 may preferably be switched between multiple values, i.e., between 1, 2, 4, . . . , according to the state of the setting pin MODE.

With the position instruction value generating unit 312 shown in FIG. 6C, the two values to be input to the selector 327 may preferably be configured as a switchable rate such as "times one", "times two", "times four", . . . , according to the state of the setting pin MODE.

It should be noted that the setting method for the change amount ΔTGT that corresponds to the gear ratio is not restricted to such an arrangement employing the setting pin MODE. Also, the setting value may be written to a register using an I²C (Inter IC) interface, SPI (Serial Peripheral Interface), or the like.

It should be noted that the value of ΔTGT is not restricted to 1, 2, 4, . . . . Also, ΔTGT may be configured as a desired integer. Alternatively, ΔTGT may be configured as ½, ¼, ⅛, . . . . Also, ΔTGT may be configured as a desired fraction. By configuring ΔTGT such that ΔTGT<1 holds true, this arrangement allows a deceleration control operation.

Figure 20:
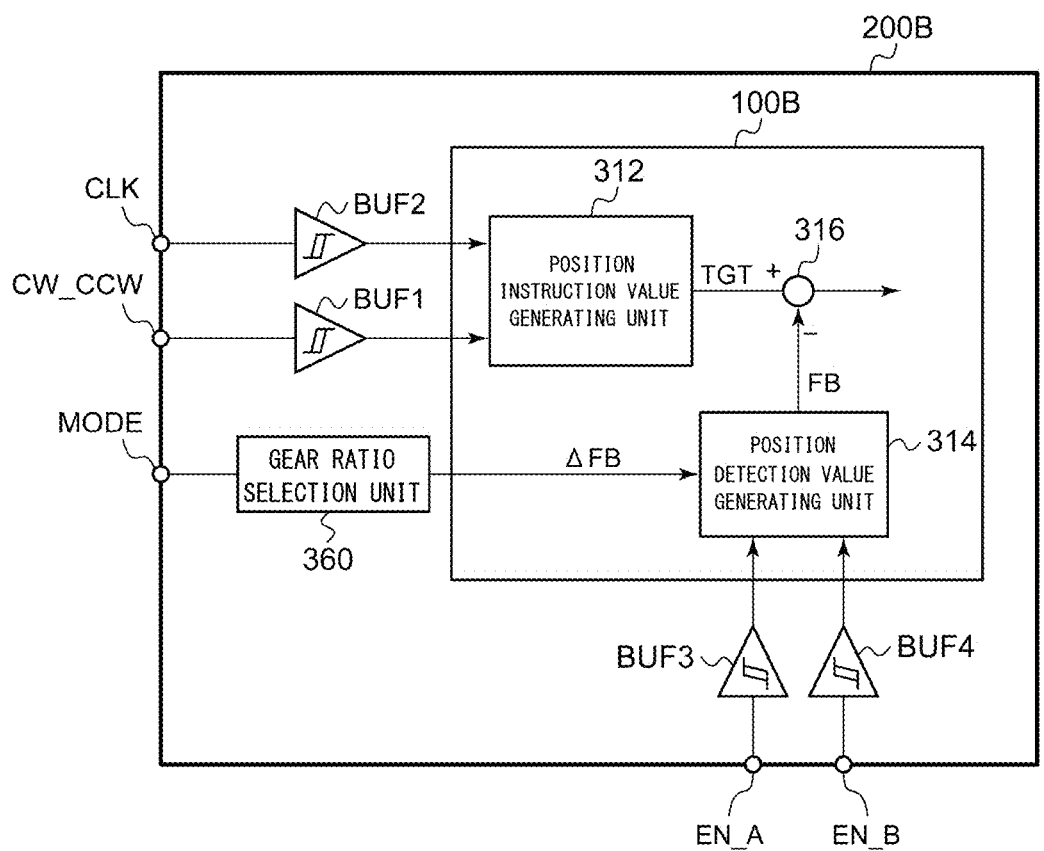
FIG. 20 is a block diagram showing a driving IC having an electronic gear function.

FIG. 20 is a block diagram showing a driving IC 200B including the electronic gear function. In the driving IC 200B, the change amount of the target value TGT is maintained at a constant level. Instead, this arrangement is capable of changing the change amount ΔFB of the feedback value FB for each pulse of EN_A and EN_B. The change amount ΔFB can be designed to be an integer or non-integer as desired. When the change amount ΔFB per pulse of EN_A (EN_B) is raised, this arrangement allows the rotational speed to be lowered. Conversely, when the change amount ΔFB per pulse of EN_A (EN_B) is lowered, this arrangement allows the rotational speed to be raised. A gear ratio selection unit 360 is a block that corresponds to the comparator CMP1 (or otherwise A/D converter) shown in FIG. 19, and selects the change amount ΔFB according to the state of the setting pin MODE.

Usage

Figure 21:
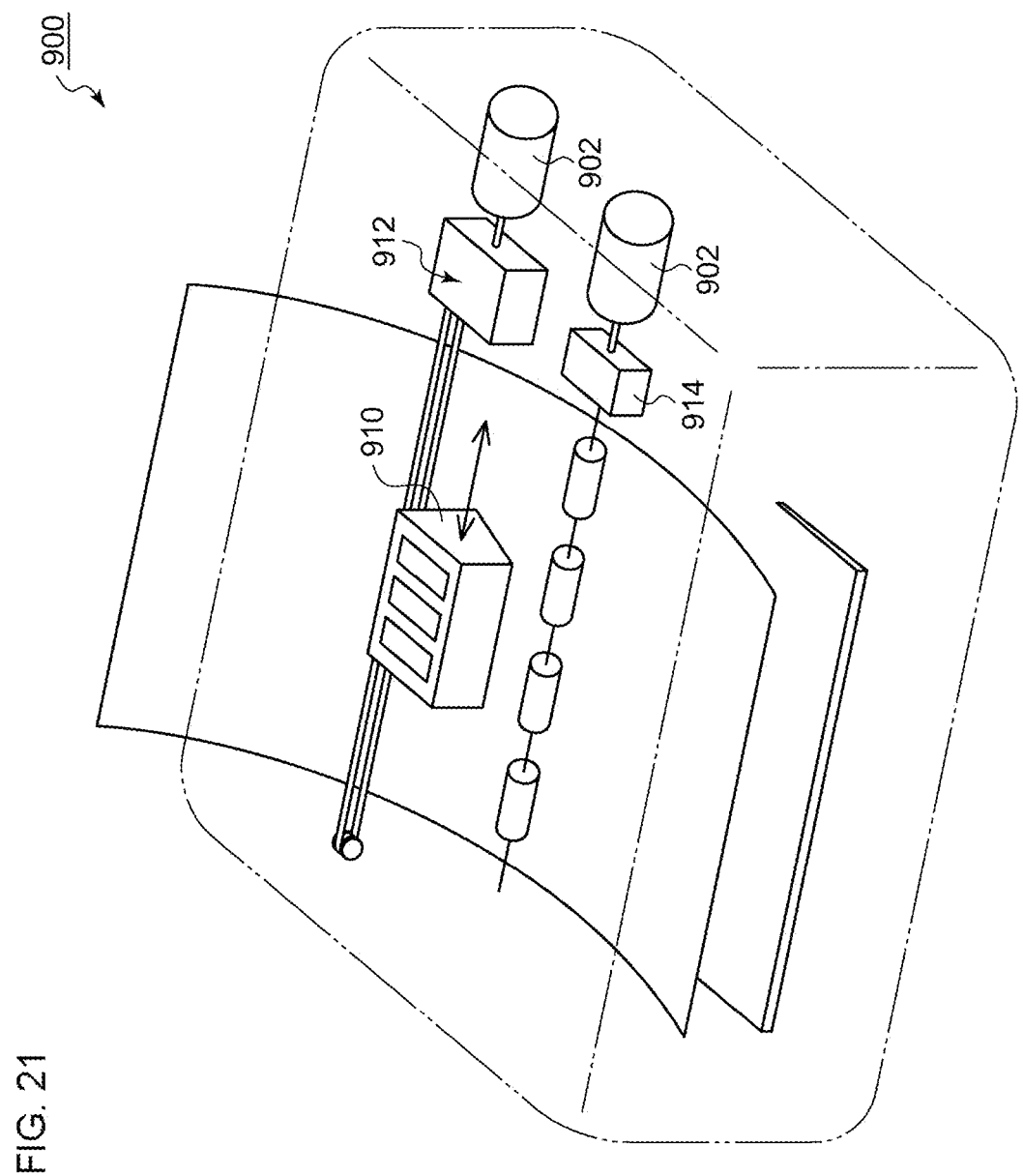
FIG. 21 is a diagram showing an electronic device including a motor driving system.

FIG. 21 is a diagram showing an electronic device including the motor driving system 100. FIG. 21 shows a printer as an example of an electronic device 900. The electronic device 900 includes multiple DC motors 902 and 904. For example, the DC motor 902 is employed as a driving mechanism 912 for a print head 910. The DC motor 904 is employed as a driving mechanism 914 for a sheet feeder.

It should be noted that the usage of the motor driving system 100 is not restricted to such a printer. Also, the motor driving system 100 is applicable to various kinds of office automation equipment, industrial equipment, and industrial apparatuses.

Description has been made above regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Modification 1

Description has been made in the embodiments regarding a motor driving operation using Hall sensors. Also, an arrangement may be made employing a sensorless motor driving operation. In this case, the driving IC 200 may preferably mount a comparator that detects the back electromotive force.

Modification 2

Description has been made in the embodiments regarding an arrangement in which a charge pump is employed in order to generate the gate driving voltage for the high-side transistors of the driver 106. Also, a bootstrap circuit may be provided as a built-in component. Also, the high-side transistors of the driver 106 may each be configured as a P-channel transistor. In this case, such an arrangement does not require such a charge pump.

Modification 3

Description has been made in the embodiments regarding an arrangement in which the driver 106 is provided to the driving IC 200 as an external component. Also, the driver 106 may be integrated on the driving IC 200. Conversely, description has been made in the embodiments regarding an arrangement in which the pre-driver 250 is integrated in the driving IC 200. Also, the pre-driver 250 may be provided as an external component of the driving IC 200. For example, the driver 106 and the pre-driver 250 may be integrated.

Modification 4

Description has been made in the embodiments regarding an arrangement in which the driving IC is configured as a logic circuit. However, the present invention is not restricted to such an arrangement. Also, a block represented by the logic circuit 300 may be configured as a combination of a processor (CPU or microcomputer) and a software program.

While the preferred embodiments of the present invention have been described using specific terms, such description is for illustrative purposes only, and it is to be understood that changes and variations may be made without departing from the spirit or scope of the appended claims.

What is claimed is:

1. A driving circuit for a DC motor, comprising:
   an error detector coupled to receive a clock signal from a host controller and a pulse signal from an encoder, and structured to generate a position error value that is a difference between a current position of a rotor of the DC motor based on the pulse signal and a target position of the rotor based on the clock signal;
   a feedback controller structured as a logic circuit, and structured to generate an instruction value such that the position error value approaches zero; and
   a driving signal generating unit structured as a logic circuit, and structured to generate a driving signal that corresponds to the instruction value,
   wherein the driving circuit is integrated on a single semiconductor substrate, and
   wherein the feedback controller comprises a PI (Proportional Integral) controller.

2. The driving circuit according to claim 1, wherein control characteristics of the PI controller are dynamically changed according to a frequency of the clock signal.

3. The driving circuit according to claim 2, wherein an integral gain set for the PI controller is maintained at a constant value, and a proportional gain thereof is changed according to the frequency of the clock signal.

4. The driving circuit according to claim 1, wherein the error detector comprises:
   a position instruction value generating unit structured to generate a target value that corresponds to an integrated value of a number of edges of the clock signal;
   a position detection value generating unit structured to generate a feedback value indicative of a current position of the rotor based on the pulse signal; and
   a subtractor structured to generate a difference between the target value and the feedback value.

5. The driving circuit according to claim 4, wherein the position instruction value generating unit is structured to select a change amount of the target value for each edge of the clock signal from among a plurality of values.

6. The driving circuit according to claim 4, wherein the position instruction value generating unit is structured to select a change amount of the feedback value for each pulse of the pulse signal from among a plurality of values.

7. The driving circuit according to claim 5, further comprising a setting pin for setting the change amount.

8. The driving circuit according to claim 1, further comprising a pre-driver structured to control an inverter that drives the DC motor.

9. An electronic device comprising:
   a DC motor;
   a driver comprising an inverter structured to drive the DC motor; and
   the driving circuit according to claim 1, structured to control the driver.

10. The driving circuit according to claim 1, integrated on a single semiconductor substrate.

11. A driving circuit structured to drive a DC motor according to a clock signal received from a host controller and a pulse signal indicative of a current position of a rotor of the DC motor received from an encoder, the driving circuit comprising:
    an error detector structured to generate a position error value that corresponds to a difference between a position instruction value indicative of a target position of the rotor based on the clock signal and a position detection value indicative of the current position of the rotor based on the pulse signal;
    a feedback controller structured to generate a torque instruction value such that the position error value approaches zero; and
    a driving signal generating unit structured to generate a driving signal that corresponds to the torque instruction value,
    wherein a mode is switchable between a rotational driving control mode and a holding mode,
    and wherein at least one from among control characteristics set for the feedback controller and a generating method for the driving signal employed in the driving signal generating unit is switched according to switching between the rotational driving control mode and the holding mode.

12. The driving circuit according to claim 11, wherein the feedback controller comprises a PI (Proportional Integral) controller,
    and wherein at least one from among a proportional gain and an integral gain to be set for the PI controller is switched to a different value according to switching between the rotational driving control mode and the holding mode.

13. The driving circuit according to claim 12, wherein an integrated value is reset to zero when a mode is switched between the rotational driving control mode and the holding mode.

14. The driving circuit according to claim 11, further comprising a mode judgment unit structured to judge whether a mode is set to the rotational driving control mode or the holding mode based on an input state of the clock signal.

15. The driving circuit according to claim 14, wherein the mode judgment unit comprises a counter structured to measure a duration of a non-input state of the clock signal, and wherein, when the non-input state of the clock signal has continued for a predetermined period of time, the mode judgment unit switches the mode from the rotational driving control mode to the holding mode.

16. The driving circuit according to claim 11, wherein the feedback controller comprises a first controller that relates to the rotational driving control mode and a second controller that relates to the holding mode.

17. The driving circuit according to claim 11, wherein the feedback controller comprises a single controller,
and wherein a gain is switched according to switching between the rotational driving control mode and the holding mode.

18. The driving circuit according to claim 11, wherein, in the rotational driving control mode, the driving signal generating unit determines a rotational direction according to a direction instruction signal received from the host controller,
and wherein, in the holding mode, the driving signal generating unit determines the rotational direction based on a sign of the torque instruction value.

19. The driving circuit according to claim 11, wherein the driving signal generating unit comprises:
a pulse width modulator structured to generate a PWM (Pulse Width Modulation) signal having a duty ratio that corresponds to the torque instruction value; and
an energization logic structured to generate the driving signal based on the PWM signal and an output of a Hall comparator.

20. The driving circuit according to claim 11, further comprising a pre-driver structured to control an inverter structured to drive the DC motor.

21. An electronic device comprising:
a DC motor;
a driver comprising an inverter structured to drive the DC motor; and
the driving circuit according to claim 11, structured to control the driver.

22. A driving method for a DC motor, comprising:
generating a position instruction value indicative of a target position of a rotor of the DC motor, based on a clock signal received from a host controller;
generating a position detection value indicative of a current position of the rotor, based on a pulse signal indicative of a position of the rotor of the DC motor received from an encoder;
selecting a mode from among a rotational driving control mode and a holding mode; and
generating a torque instruction value such that a difference between the position detection value and the position instruction value approaches zero with control characteristics that are switched according to switching between the rotational driving control mode and the holding mode.

23. A driving method for a DC motor, comprising:
generating a position instruction value indicative of a target position of a rotor of the DC motor, based on a clock signal received from a host controller;
generating a position detection value indicative of a current position of the rotor, based on a pulse signal indicative of a position of the rotor of the DC motor received from an encoder;
generating a torque instruction value such that a difference between the position detection value and the position instruction value approaches zero;
selecting a mode from among a rotational driving control mode and a holding mode; and
generating a driving signal that determines a state of an inverter based on the torque instruction value with a generating method for the driving signal that is switched according to switching between the rotational driving control mode and the holding mode.

* * * * *